United States Patent
Kawaguchi

[11] Patent Number: 5,303,066
[45] Date of Patent: Apr. 12, 1994

[54] IMAGE COMMUNICATION SYSTEM HAVING A FUNCTION FOR SHORTENING THE PRE-MESSAGING PROCEDURE

[75] Inventor: Tetsuya Kawaguchi, Ebina, Japan
[73] Assignee: Ricoh Company, Ltd., Tokyo, Japan
[21] Appl. No.: 611,827
[22] Filed: Nov. 13, 1990
[30] Foreign Application Priority Data
  Nov. 13, 1989 [JP] Japan .................. 1-292466
[51] Int. Cl.⁵ ........................... H04N 1/32
[52] U.S. Cl. ..................... 358/434; 358/440
[58] Field of Search ............ 358/404, 406, 407, 437, 358/440, 444, 463, 400, 434, 443, 412; 379/100; H04N 1/32, 1/42

[56] References Cited

U.S. PATENT DOCUMENTS

| | | | |
|---|---|---|---|
| 3,962,534 | 8/1976 | Ogawa . | |
| 4,583,124 | 4/1986 | Tsuji et al. | 358/443 |
| 4,646,160 | 2/1987 | Iizuka et al. | 358/402 |
| 4,829,559 | 5/1989 | Izawa et al. | 358/468 |
| 4,910,506 | 3/1990 | Yoshida et al. | 358/400 |
| 4,910,610 | 3/1990 | Utsugi | 358/434 |
| 4,920,560 | 4/1990 | Kageyama | 358/440 |
| 4,930,017 | 5/1990 | Izawa | 358/468 |
| 4,975,783 | 12/1990 | Takaoka | 358/437 |
| 4,991,200 | 2/1991 | Lin | 358/468 |
| 5,020,096 | 5/1991 | Sakakibara et al. | 358/444 |
| 5,103,318 | 4/1992 | Takaoka | 358/404 |
| 5,208,681 | 5/1993 | Yoshida | 358/404 |

FOREIGN PATENT DOCUMENTS

| | | |
|---|---|---|
| 3447466 | 9/1985 | Fed. Rep. of Germany . |
| 61-219262 | 9/1986 | Japan . |
| 61-263359 | 11/1986 | Japan . |
| 1-200780 | 8/1989 | Japan . |
| 200780 | 8/1989 | Japan . |

OTHER PUBLICATIONS

McConnell, Kenneth R., et al.: Fax: Digital Facsimile Technology & Applications, Norwood Mass., published by Artech House, 1989, pp. 40-52.

Primary Examiner—Edward L. Coles, Sr.
Assistant Examiner—Kim Yen Vu
Attorney, Agent, or Firm—Oblon, Spivak, McClelland, Maier & Neustadt

[57] ABSTRACT

A facsimile system includes a transmitting unit and a receiving unit which is connected to the transmitting unit by a telephone line. The facsimile system performs a pre-message procedure between the transmission unit and the receiving unit before the transmitting unit transmits the image information to the receiving unit. A part of the pre-message procedure is omitted on the basis of the condition of the transmitting unit and the receiving unit.

20 Claims, 18 Drawing Sheets (a) 9600 bps
(b) 9600 bps → 7200 bps
(c) 9600 bps → 7200 bps
(d) 7200 bps
(e) 7200 bps
(f) 7200 bps
(g) 9600 bps + TCF

LEARNING PROCEDURE

SHORTENED PROCEDURE

RELEARNING PROCEDURE

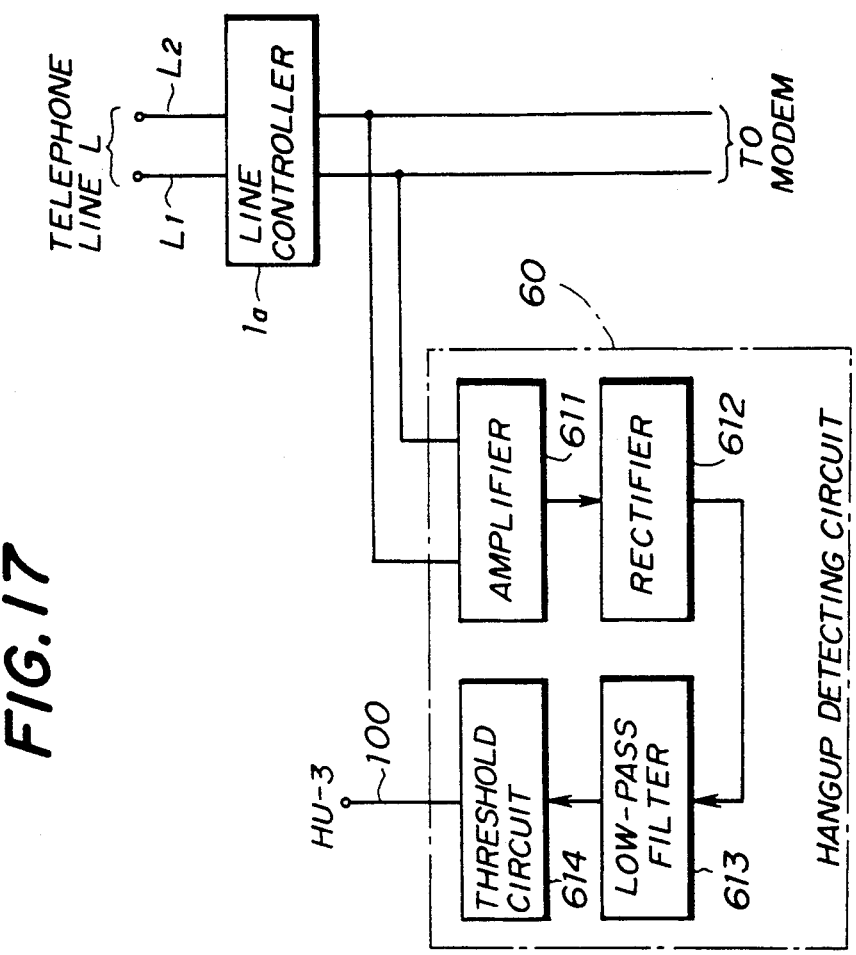

IMAGE COMMUNICATION SYSTEM HAVING A FUNCTION FOR SHORTENING THE PRE-MESSAGING PROCEDURE

BACKGROUND OF THE INVENTION

The present invention generally relates to a facsimile system, and more particularly to a facsimile system capable of shortening the time required for the carrying out of a pre-message procedure.

Generally, in a group three (G3) facsimile system, a communication, with regard to a transmission function which may be used when image information is transmitted, is performed between a calling station and a called station before the transmission of the image information. A procedure carried out for a communication performed before the transmission of image information described above is called a pre-message procedure. According to the communication performed on the basis of the pre-message procedure, transmission functions which can be used by the calling station and the called station are determined, and then the calling station transmits the image information to the called station on the basis of the determined transmission functions.

The pre-message procedure is described in CCITT Recommendations T.30, the disclosure of which is hereby incorporated by reference.

Recently, in the group three (G3) facsimile system, the time required for a transmission of image information has been shortened so that the ratio of the time required for the performance of the pre-message procedure to the time required for the transmission of image information has increased. That is, in a conventional facsimile system, there is a new disadvantage in that the time required for the pre-message procedure has increased relatively.

SUMMARY OF THE INVENTION

Accordingly, a general object of the present invention is to provide a novel and useful facsimile system in which the above disadvantage of the aforementioned prior art is eliminated.

A more specific object of the present invention is to provide a facsimile system capable of shortening the time required for the performance of a pre-message procedure.

The above objects of the present invention are achieved by a facsimile system comprising a transmitting unit, and a receiving unit which is connected to the transmitting unit by a line, wherein a pre-message procedure is performed between the transmitting unit and the receiving unit before the transmitting unit transmits image information to the receiving unit, the pre-message procedure having a first procedure in which the receiving unit called by the transmitting unit sends a first signal for identifying the receiving unit to the transmitting unit, a second procedure in which the receiving unit sends a second signal for informing about functions provided in the receiving unit to the transmitting unit, a third procedure in which the transmitting unit determines transmission functions to be used for communicating with the receiving unit and sends a third signal corresponding to the transmission functions to the receiving unit, and a fourth procedure in which the receiving unit sets the transmission functions in itself by referring to the third signal, the transmitting unit comprising, hangup detecting means for detecting a hangup of the receiving unit called by the transmitting unit, tone signal generating means for generating a tone signal, memory means for storing function information regarding the functions provided in the receiving unit, first control means, coupled to the hangup detecting means and the memory means, for starting the third procedure by referring to the function information stored in the memory means when the hangup detecting means detects the hangup of the receiving unit before the first procedure, and second control means, coupled to the tone signal generating means and the memory means, for sending the tone signal generated by the tone signal generating means to the receiving unit and for starting the third procedure by referring to the function information stored in the memory means after sending the tone signal when the first procedure is performed before the hangup detecting means detects the hangup of the receiving unit, the receiving unit comprising, third control menas for omitting the first procedure and the second procedure when the third procedure is performed before starting the first procedure, and fourth control means for omitting the second procedure when the tone signal is received before completing the first procedure.

The above mentioned objects of the present invention can also be achieved by a facsimile system comprising a transmitting unit, and a receiving unit which is connected to the transmitting unit by a line, wherein a pre-message procedure for determining transmission functions used for a communication between the transmitting unit and the receiving unit is performed between the transmitting unit and the receiving unit before the transmitting unit transmits image information to the receiving unit, the transmitting unit comprisng, a history table for storing modem speeds used for communications between the transmitting unit and the receiving unit, and determining means, coupled to the history table, for determining an optimum modem speed to be used for a communication between the transmitting unit and the receiving unit byreferring the modem speeds stored in the history table during the pre-message procedure.

In addition, the above objects of the present invention can also be ahieved by a facsimile system comprising a transmitting unit, a receiving unit which is connected to the transmitting unit by a line, wherein a pre-message procedure for determining transmission functions used for a communication between the transmitting unit and the receiving unit is performed between the transmitting unit and the receiving unit before the transmitting unit transmits image information to the receiving unit, the pre-message procedure having an informing function procedure in which the receiving unit sends an informing signal for informing about functions provided in the receiving unit to the transmitting unit, a determining function procedure in which the transmitting unit determines transmission functions used for communicating with the receiving unit and sends a function signal representing the transmission functions to the receiving unit and a setting procedure in which the receiving unit sets the transmission functions in itself by referring to the function signal, the informing signal having a first field including information corresponding to the functions provided in the receiving unit and a second field including a checking information for checking a transmission error of the informing signal, the checking information having a one-to-one correspondance with the information included in the first field of the informing signal, the transmitting unit comprising, memory means for storing the information included in the first field of the informing signal and the checking information, first control menas, coupled to the memory means, for starting the determining function procedure by referring to the information in the memory means and for adding the checking information in the memory means to the function signal, the receiving unit comprising, checking means for determining whether or not the checking information included in the function signal transmitted from the transmitting unit is identical to the checking information included in the informing signal generated by the receiving unit, second control means, coupled to the checking means, for starting the setting procedure by referring to the function signal when the checking means determines that the checking information included in the function signal transmitted from the transmitting unit is identical to the checking information included in the informing signal.

Additional objects, features and advantages of the present invention will become apparent from the following detailed description when read in conjunction with the accompanying drawings.

BRIEF DESCRIPTION OF THE DRAWINGS

FIGS. 4A through 6B are diagrams showing examples of communication protocols between the transmitter TX and receiver RX;

FIGS. 15 through 17 are circuit diagrams showing examples of hangup detecting circuits.

DESCRIPTION OF THE PREFERRED EMBODIMENTS

A description will now be given of a preferred embodiment of the present invention with reference to FIGS. 1 through 4C.

Figure 1:
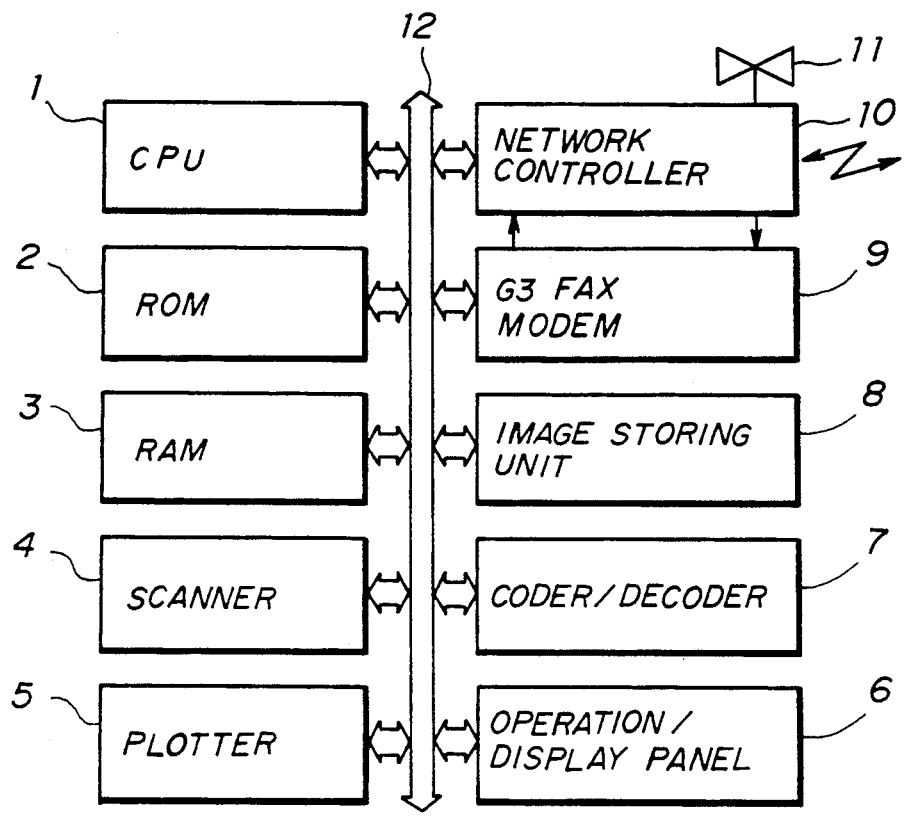
FIG. 1 is a block diagram showing a example of a facsimile machine according to the present invention.

Referring to FIG. 1, which shows an example of a structure Of a group three (G3) facsimile set, the facsimile set has a CPU 1 (Central Processing Unit), a ROM 2 (Read Only Memory), a RAM 3 (Random Access Memory), a scanner 4, a plotter 5, an operation/display panel 6 and a coder/decoder 7. The facsimile set also has an image storing unit 8, a modem 9 and a network controller 10.

The CPU 1 controls each part of the facsimile set and performs a process in accordance with a predetermined transmission control procedure. The ROM 2 stores programs which are run in CPU 1 and various data for processes performed in accordance with the programs. A working area for the CPU 1 is provided on the RAM 3, and the RAM 3 stores various data which are required for the group three (G3) facsimile set. The scanner 4 scans a document sheet at a predetermined resolution and reads an image on the document sheet. The plotter 5 records the image at a predetermined resolution on a recording sheet. The operation/display panel 6 is an interface between the facsimile set and a user and has various operation keys and various display devices. The coder/decoder 7 codes and compresses image signals, and decodes the coded and compressed image information into original image information. The coded and compressed image information is supplied to the storing unit 8. The storing unit 8 has a capacity which amounts to a predetermined plurality of pages.

The modem 9 for the group three (G3) facsimile set performs a modulation and a demodulation for the transmission of the digital data via the public telephone line. The network controller 10 connects the facsimile set to the public telephone line and releases it therefrom. The network controller 10 has a function which automatically sends and receives information. The network controller 10 is provided with a telephone unit 11 for talking on.

The CPU 1, the ROM 2, the RAM 3, the scanner 4, the plotter 5, the operation/display 6, the coder/decoder 7, the image storing unit 8, the modem 9 and the network controller 10 are respectively connected to a system bus 12. The data is mainly transmitted via the system bus 12 among the above parts. The modem 9 and the network controller 10 directly supply the data to each other.

Figure 2:
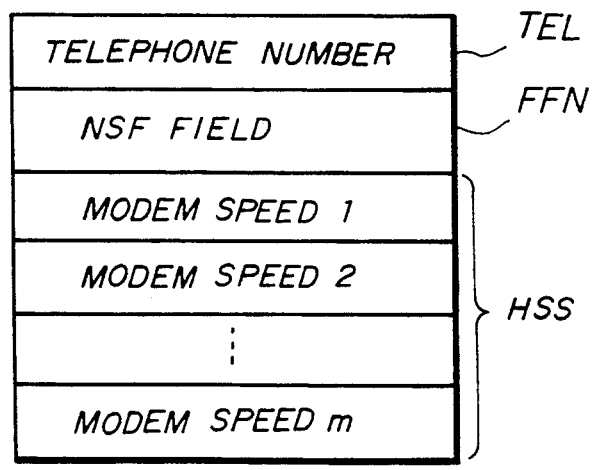
FIG. 2 shows an example of a destination mamagement table.

In this facsimile set, a destination management table is formed in the RAM 3. The destination management table is formed as shown in FIG. 2 for each of the destination stations. That is, the destination management table for each of the destination stations has telephone number information (TEL) of a corresponding destination station, NSF field information (FFN) and modem speed history information (HSS). The NSF field information (FFN) represents a field of a signal for determining a function of non-standard facilities. The modem speed history information (HSS) has m modem speed data which are used in the last m transmissions of the image information.

Figure 3:
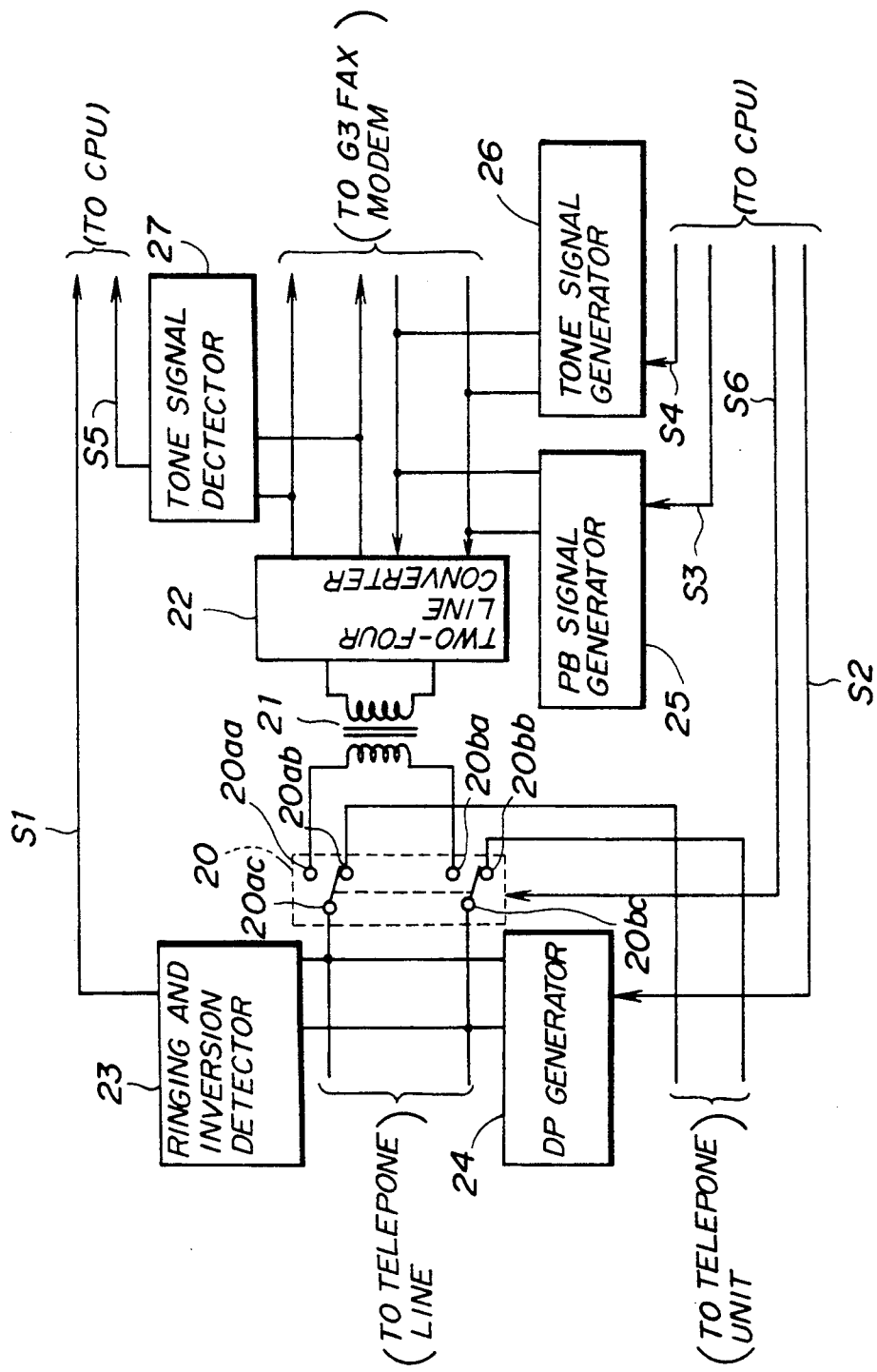
FIG. 3 is a block diagram showing the structure of the network controller shown in FIG. 1.
Figure 4:
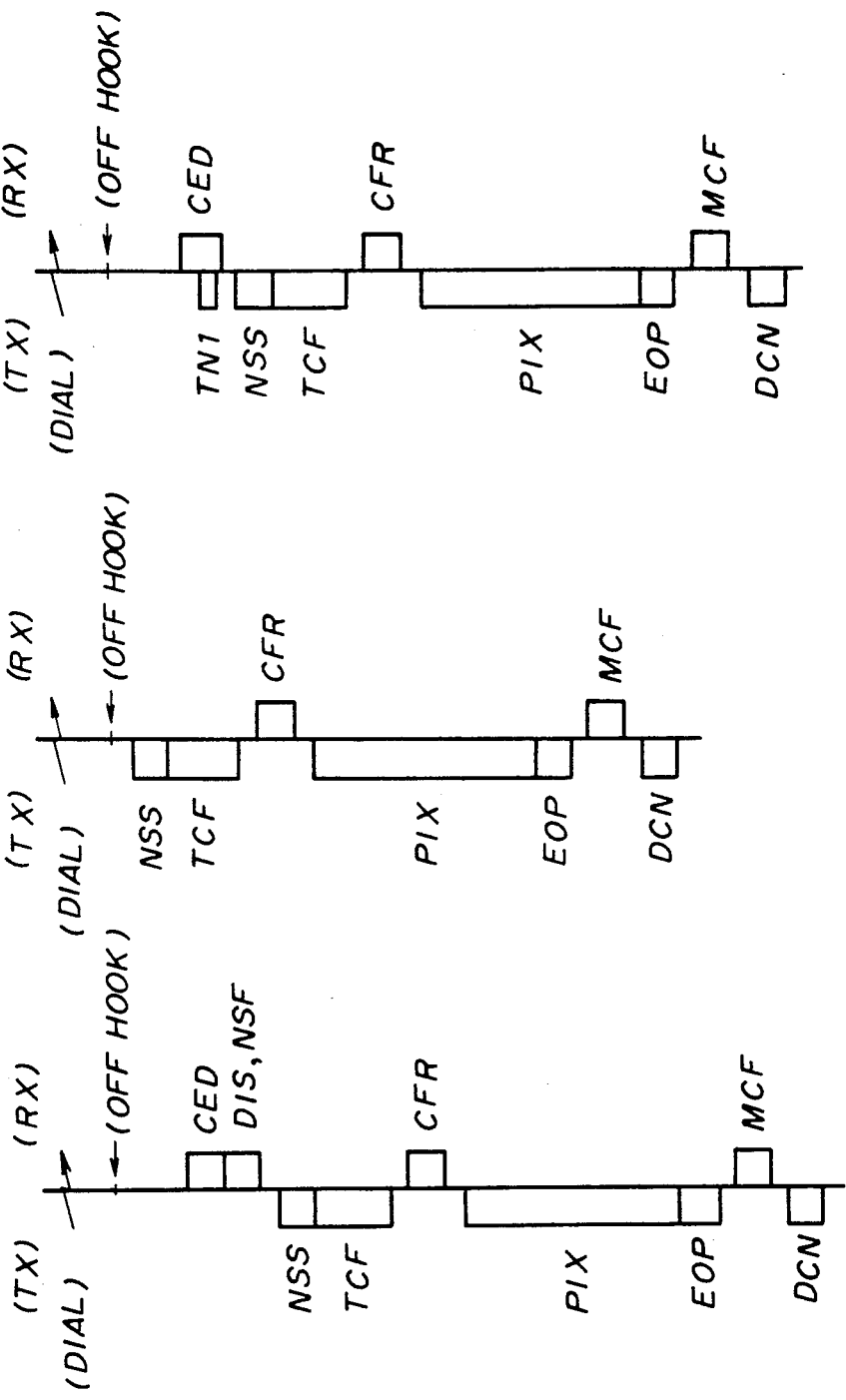

The network controller 10 is, for example, made up as shown in FIG. 3. Referring to FIG. 3, a switch unit 20 has two switch elements. Common terminals 20ac and 20bc of both the switch elements are respectively connected to the telephone line. First terminals 20ab and 20bb of both the switch elements are respectively connected to signal lines extending from the telephone unit 11. Second terminals 20aa and 20ba of both the switch elements are respectively connected to both ends of a primary coil of a transformer 21. A two-four line converter 22 has two terminals for the two lines and four terminals for the four lines. The terminals for the two lines of the two-four line converter 22 are connected to both ends of a secondary coil of the transformer 21. The terminals for the four lines of the two-four line converter 22 are coupled to the modem 9. A ringing and inversion detector 23 detects a ring back tone from an exchange. The ringing and inversion detector 23 also detects an inversion of a polarity of a dc-power on the telephone line. The inversion of the polarity of the dc-power on the telephone line is termed a polarity inversion. The ringing and inversion detector 23 supplies a detection signal S1 to the CPU 1 when the ring back tone or the polarity inversion is detected.

A dial pulse generator 24 outputs a dial pulse signal as a selection signal to the telephone line. The dial pulse generator 24 is controlled on the basis of a control signal S2 supplied from the CPU 1. A push button signal generator 25 outputs a push button signal as the selection signal to the telephone line. An output signal from the push button signal generator 25 is supplied across two input terminals out of the four terminals of the two-four line converter 22. The push button signal generator 25 is controlled on the basis of a control signal S3 supplied from the CPU 1. A tone signal generator 26 is provided for supplying a predetermined tone signal TN1 to the telephone line. An output signal from the tone signal generator 26 is applied across the two input terminals out of the four terminals of the two-four line converter 22. The tone signal generator 26 is controlled on the basis of a control signal S4 supplied from the CPU 1. A tone signal detector 27 detects the tone signal TN1 transmitted from a party via a telephone line. Input terminals of the tone signal detector 27 are connected to two output terminals out of the four terminals of the two-four line converter 22. A detection signal output from the tone signal detector 27 is supplied to the CPU 1. The switch unit 20 is switched on the basis of a control signal S6 supplied from the CPU 1.

In the group three (G3) facsimile system, when the destination management table corresponding to a destination station specified by a user's operation of the operation/display panel 6 is not formed in the RAM 3, a regular transmission procedure as shown in FIG. 4A is performed.

This group three (G3) facsimile system has a transmitter TX which transmits the image information and a receiver RX which receives the image information transmitted from the transmitter TX. The following description will be given of a case in which the image information for a one page document is transmitted.

Referring to FIG. 4A, when the telephone number of the destination station and conditions for the transmission of the image information are input from the operation/display panel 6 of the transmitter TX, the transmitter TX calls the receiver RX (dialing). Therefore, the exchange transmits the ring back tone to the receiver RX. In the receiver RX, the ringing and inversion detector 23 in the network controller 10 detects the ring back tone and supplies the detection signal to the CPU 1. When the above happens, the switch unit 20 selects second terminals 20aa and 20ba on the basis of the control signal S6 supplied from the CPU 1 so that both of the ends of the primary coil of the transformer 21 are coupled to the telephone line, and thus the dc closed loop is formed on the telephone line (off-hook).

Therefore, in the transmitter TX, the ringing and inversion detector 23 detects the inversion of the polarity of the dc-power on the phone line and supplies the detection signal to the CPU 1.

In addition, the receiver RX transmits a called station identification signal (CED) during a constant time Tb when a constant time Ta (for example, about 2 sec.) elapses from the time of the off-hook. Then the receiver RX outputs a digital identification signal (DIS) and a non-standard facilities signal (NSF). The digital identification signal (DIS) is used for informing a local station about standard functions provided. The non-standard facilities signal (NSF) is used for informing the local station about non-standard functions provided. Information which indicates a function for shortening the pre-message procedure is an element in the non-standard facilities signal (NSF). When the transmitter TX receives the digital identification signal (DIS) and the non-standard facilities signal (NSF), the transmitter TX recognizes the functions provided to the receiver RX and sets up functions which are capable of being used in the transmitter TX. Then the transmitter TX outputs a non-standard set-up signal (NNS) so that the receiver RX is informed about the functions which are set up. After that, to perform the modem training at a modem speed which is set up, the transmitter TX outputs a training check signal (TCF).

When the information which indicates the function for shortening the pre-message procedure is included in the non-standard facilities signal (NSN), a new destination management table corresponding to the receiver RX which is a destination station for the transmitter TX is formed. That is, the telephone number information (TEL) of the receiver RX and the NSF field information (FFN) are formed in the destination management table on the basis of the non-standard facilities signal (NSF) transmitted from the receiver RX.

In the receiver RX, when the training check signal (TCF) is satisfactorily received, a confirmation received signal (CFR) is returned to the transmitter TX. Then the receiver RX prepares to receive the image information.

In the transmitter TX, when the confirmation received signal (CFR) is received, the image signal output from the scanner 4 which scans the document is coded and compressed by the coder/decoder 7. The image information (PIX) obtained from the coder/decoder 7 is then transmitted. After that, an end of procedure signal (EOP) which indicates that there no page remain is transmitted.

In the receiver RX, the coder/decoder 7 decodes the received image information (PIX) into the Original image signal. The original image signal is supplied to the plotter 5, and then the plotter 5 records the image corresponding to the original image signal on the recording sheet. When the receiving of the image information (PIX) is completed, the number of information elements which are decoded into erroneous signals is counted. Then, when the number of information elements which are decoded into erroneous signals is equal to or less than a predetermined number, it is discriminated that the image information has been normally received, and thus, a message confirmation signal (MCF) is returned to the transmitter TX.

The transmitter TX Outputs a disconnect signal (DCN) when the message confirmation signal (MCF) is received. Then the line is released, and the procedure series for the transmission of the image information is completed.

When the receiver RX receives the disconnect signal (DCN), the receiver RX releases the line and the procedure series for the receiving of the image information is completed.

In the transmitter TX, when the destination management table with regard to the receiver RX is formed in the RAM 3, the modem speed which is used for the communication of the image information is added to the modem speed history information (HSS).

When the transmitter TX calls a destination station, which operates as the receiver RX and whose destination management table has been formed in the RAM 3, a shortened transmission procedure, which is obtained by shortening the pre-message procedure, as show in FIG. 4B or FIG. 4C, is performed. FIG. 4B shows the transmission procedure in a case where the polarity inversion occurs on the line connected to the receiver RX at the time of the off-hook. FIG. 4C shows the transmission procedure in a case where the polarity inversion does not occur on the line connected to the receiver RX at the time of the off-hook.

The transmitter TX discriminates whether either the polarity inversion occurs or the called station identification signal (CED) is detected. When the transmitter TX detects the polarity inversion on the telephone line, the transmitter TX immediately outputs the non-standard set-up signal (NNS) which is used for informing the receiver RX about the transmission functions determined on the basis of the NSF field information (FNN) in the destination management table corresponding. After that, the transmitter TX outputs the training check signal (TCF).

The receiver RX normally returns the called station identification signal (CED) when the time Ta elapses from the time of the off-hook. However, when the receiver RX receives the non-standard set-up signal (NSS) from the transmitter TX before returning the called station identification signal (CED), no called station identification signal (CED) is returned and the transmission functions are immediately set up on the basis of the non-standard set-up signal (NSS). After that, the image information (PIX) is transmitted from the transmitter TX to the receiver RX in accordance with the same procedure as the regular transmission procedure described above.

On the other hand, when the transmitter TX detects no polarity inversion on the telephone line, the communication between the transmitter TX and the receiver RX is performed in accordance with a procedure shown in FIG. 4C. That is, when the transmitter TX detects no polarity inversion, the transmitter TX waits to transmit the non-standard set-up signal (NSS). Then the receiver RX outputs the called station identification signal (CED) when the time Ta elapses from the time of the off-hook. In the transmitter TX, when the called station identification signal (CED) is received, the tone signal TN1 is immediately output for a predetermined short time from the tone signal generator 26. When a predetermined time elapses from the outputting of the tone signal TN1, the transmitter TX outputs the non-standard set-up signal (NSS) corresponding to the determined transmission functions.

When the receiver RX detects the tone signal TN1 transmitted from the transmitter TX during the outputting of the called station identification signal (CED), the receiver RX stops outputting the called station identification signal (CED), and prepares to receive the non-standard set-up signal (NSS). After that, the image information (PIX) is transmitted from the transmitter TX to the receiver RX in accordance with the same procedure as the regular transmission procedure described above.

In this embodiment, the transmitter TX immediately starts the procedure in a phase B when the answer for the incoming call (off-hook) is detected so that it is possible to decrease the time required for performing the pre-message procedure.

The functions which are provided for the receiver RX are changed so that the functions included in the NSF field information (FNN) in the destination management table formed in the transmitter TX differ from the functions included in the non-standard facilities signal (NSF) output from the receiver RX. In this case, the communication between the transmitter TX and the receiver RX is performed as follows.

Figure 5:
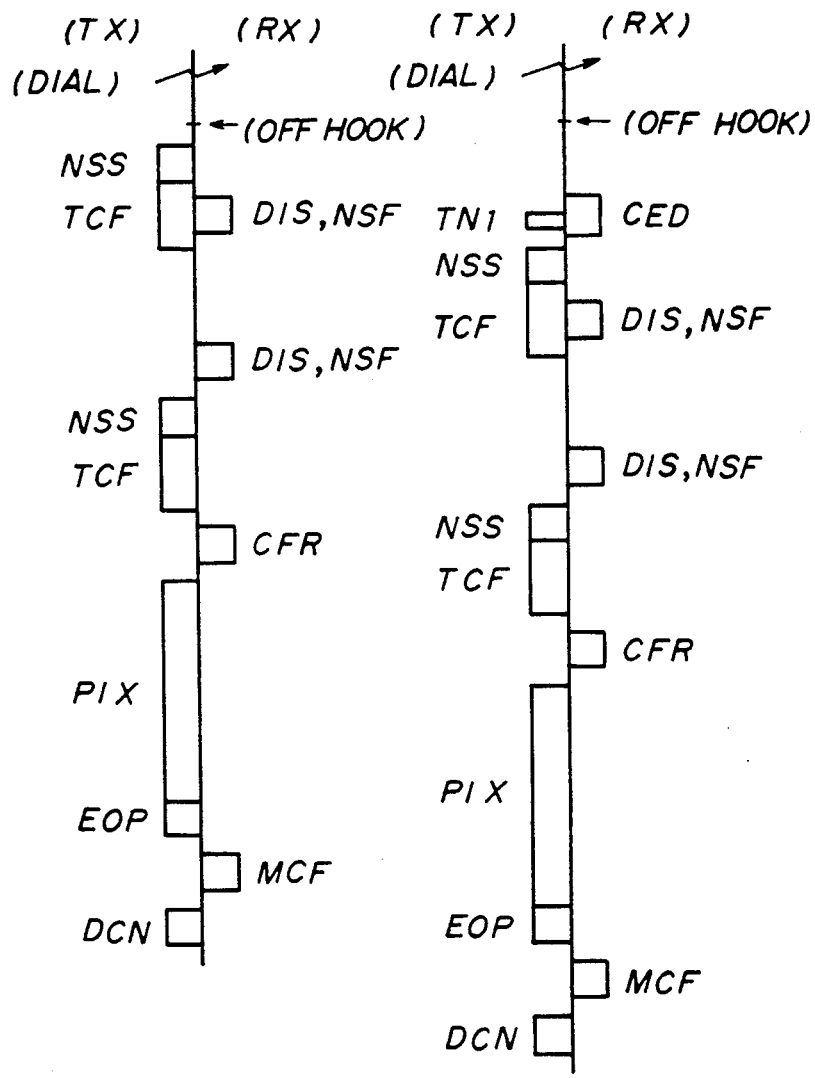

In a case where the receiver RX is connected to a telephone line on which the polarity inversion occurs at the time of the off-hook, the communication between the transmitter TX and the receiver RX is performed in accordance with a procedure shown in FIG. 5A. Referring to FIG. 5A, the transmitter TX successively outputs the non-standard set-up signal (NSS) and the training check signal (TCF) after detecting the off-hook of the receiver RX. When the receiver RX discriminates that it is impossible to use the functions determined by the non-standard set-up signal (NSS), the receiver RX successively returns the digital identification signal (DIS) and the non-standard facilities signal (NSF).

The transmitter TX sends the training check signal (TCF) after the non-standard set-up signal (NSS) so that it is impossible to receive the non-standard facilities signal (NSF) transmitted from the receiver RX. In addition, it is impossible for the transmitter TX to receive the answer signal which is returned from the receiver RX receiving the training check signal (TCF). Thus, the transmitter TX is in a waiting state.

When the receiver RX does not receive the non-standard set-up signal (NSS) corresponding to the non-standard facilities signal (NSF) during a determined time, the receiver RX sends the non-standard facilities signal (NSF) again.

When the transmitter TX receives the non-standard facilities signal (NSF) which is sent again from the receiver RX, the transmitter TX checks the functions specified by the non-standard facilities signal (NSF). Then, when a function regarding the shortened transmission procedure is included in the functions specified by the non-standard facilities signal (NSF), corresponding functions included in the NSF field information (FNN) in the destination management table are converted into new functions specified by the non-standard facilities signal (NSF). Then the transmitter TX sets up transmission functions on the basis of the non-standard facilities signal (NSF) and sends the non-standard set-up signal (NSS) corresponding to the transmission functions which are set up.

After that, the image information (PIX) is transmitted from the transmitter TX to the receiver RX in accordance with the same procedure as the regular transmission procedure described above.

In the transmitter TX, when there is no function corresponding to the shortened transmission procedure in the functions specified by the non-standard facilities signal (NSF), the destination management table regarding the receiver RX (the destination station) is eliminated from the RAM 3.

On the other hand, when the receiver RX is connected to the telephone line on which the polarity inversion occurs at the time of the off-hook, the communication between the transmitter TX and the receiver RX is performed in accordance with the transmission procedure shown in FIG. 5B. The procedure shown in FIG. 5A is combined with the procedure shown in FIG. 4C so that the transmission procedure shown in FIG. 5B is obtained.

Figure 6:
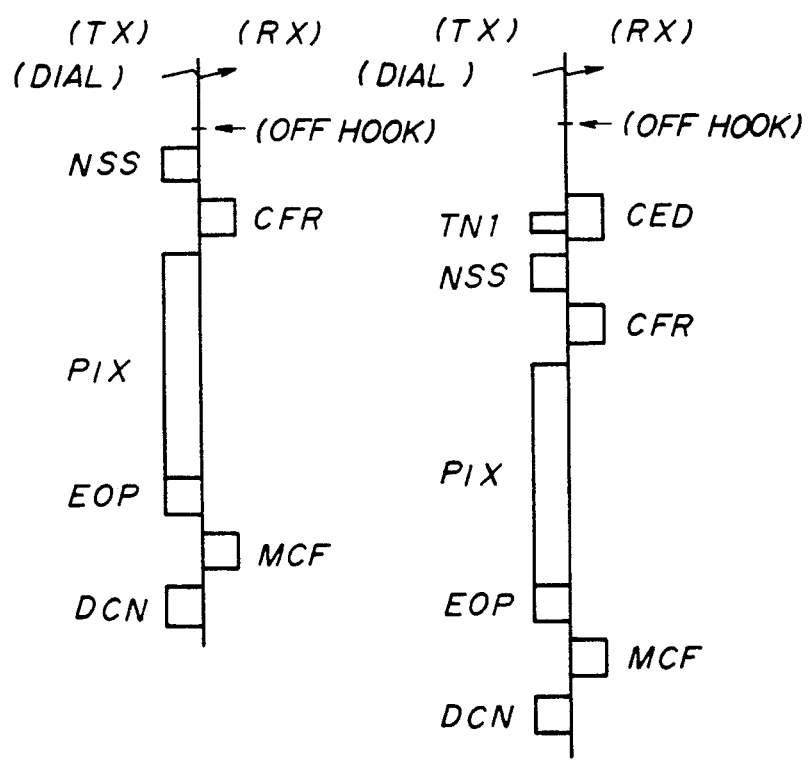

When each of all m modem speeds recorded in the modem speed history information (HSS) in the destination management table has a bit rate of 9600 bps which is a full speed for the V. 29 modem, the condition of the telephone line between the transmitter TX and the receiver RX is good. In this case, the communication is definitely performed at 9600 bps so that it is possible to communicate between the transmitter TX and the receiver RX at 9600 bps without the modem training procedure using the training check signal (TCF). Thus, the transmission procedure shown in FIG. 6A or FIG. 6B is performed. That is, information of an omission of the modem training procedure is added to the non-standard set-up signal (NSS), and the transmitter TX sends the non-standard set-up signal (NSS) to the receiver RX which is the destination station corresponding to the above mentioned destination management table. Then, when the receiver RX is informed about the omission of the modem training procedure, the receiver RX returns the confirmation to receive signal (CFR) which represents the acceptance of the omission of the modem training procedure. After that, the transmitter TX transmits the image information (PIX) to the receiver RX in accordance with a predetermined transmission procedure.

FIG. 6A shows a procedure in a case where the receiver RX is connected to the telephone line on which the polarity inversion occurs during the off-hook. FIG. 6B shows the procedure in a case where the receiver RX in connected to the telephone line on which the polarity inversion does not occur during the off-hook.

In this embodiment, the modem training procedure is omitted so that the time required for the performance of the pre-message procedure is further decreased. Thus, it is possible to substantially decrease the time required for the transmission of the image data.

The transmitter TX sets up the transmission functions, which are used for the communication, by referring to the NSF field information (FFN) in the destination management table. When the functions specified by the non-standard set-up signal (NSS) differ from the functions included in the NSF field information (NSF), there is a case where it is impossible for the receiver RX to use the transmission functions specified by the non-standard set-up signal (NSS).

To avoid disadvantages described above, for example, it has been proposed that the NSF field information (FNN) in the destination management table be added to the non-standard set-up signal (NSS). Then the NSF field information (FNN) is transmitted, along with the non-standard set-up signal (NSS), from the transmitter TX to the receiver RX. The receiver RX discriminates whether or not the non-standard facilities information (NSF), which is added to the non-standard set-up signal (NSS) transmitted from the transmitter TX, is identical to the non-standard facilities information (NSF) which is used in the receiver RX. Therefore, it is possible for the receiver RX to definitely recognize the functions included in the NSF field information (FNN) which is provided to the transmitter TX. And then it is possible for the receiver to discriminate whether or not it is possible to communicate with the transmitter TX.

However, recently, the amount of the information which is included in the non-standard facilities signal (NSF) has increased along with the increasing of the functions for the group three (G 3) facsimile system.

Thus, when the information corresponding to the functions included in the NSF field information (FFN) is further added to the non-standard set-up signal (NSS), as has been described above, the time required to transmit the non-standard set-up signal (NSS) greatly increases. In addition, a new process for the discrimination of the NSF field information (FNN) is required.

Accordingly, a description will now be given of an embodiment of the present invention, in which the aforementioned disadvantages are eliminated.

Figure 7:
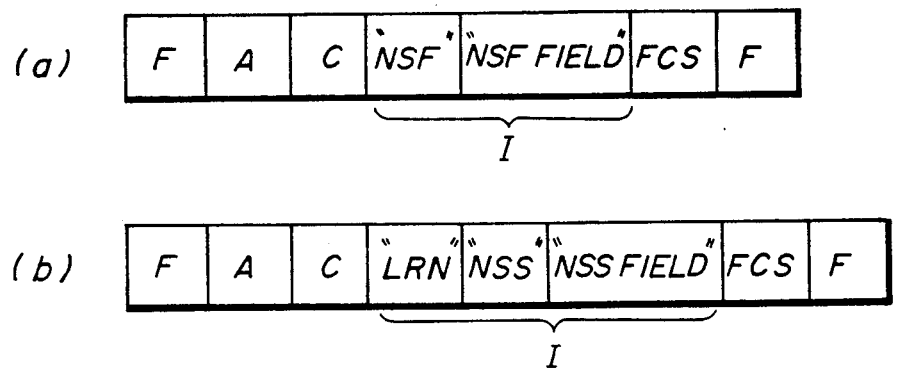
FIG. 7 shows an example of a structrue of a nonstandard fasilities signal (NSF) and an example of a structure of a non-standard set-up signal (NSS)

In this embodiment, the procedure signal such as the non-standard facilities signal (NSF) is shaped into a data flame on the basis of a high level data link control (HDLC) procedure and transmitted. FIG. 7 shows examples of the data flame.

Referring to FIG. 7 (a), the data flame has a flag sequence (F), a address field (A), a control field (C), an information field (I), a flame check sequence (FCS) and a flag sequence (F), which are arranged in this order. Each of them has a predetermined bit pattern. The information field (I) has an identification information (NSF) corresponding to a procedure signal. An information field (NSF field) is arranged next to the identification information (NSF) when needed. The flame check sequence (F) has 16 bits of CRC (Cyclic Redundancy check) data. A bit string having bits starting from a bit positioned at the start of the address field (A) to a bit positioned at the end of the information field (I) is converted, by use of a predetermined generating polynomial, into the CRC data.

The receiver RX which receives this data flame discriminates whether or not there are errors in the received data flame by referring to the flame check sequence (FCS). The flame check sequence (FCS) is in one-to-one accordance with the non-standard facilities signal (NSF).

Figure 8:
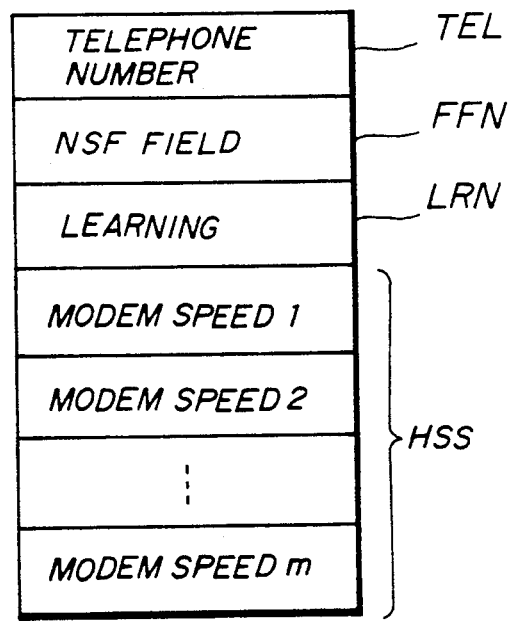
FIG. 8 is another example of a destination management tabl.

Information in the flame check sequence (FCS) arranged in the data flame of the non-standard facilities signal (NSF) is added to the destination management table as a learning information (LRN), as shown in FIG. 8. The learning information (LRN) is added to the information field of the non-standard set-up signal (NSS), as shown in FIG. 7(b). Then, the transmitter TX sends the non-standard set-up signal (NSS) including the learning information (LRN) to the receiver RX.

When the receiver RX receives the non-standard set-up signal (NSS), the receiver RX discriminates whether or not the learning information (LRN) is identical to the flame check sequence (FCS) in the data flame of the non-standard facilities signal (NSF) which is generated in this receiver RX. If it is discriminated that the learning information (LRN) is identical to the flam check sequence (FCS), the shortened pre-message procedure is performed as has been described above.

Accordingly, the length of the non-standard set-up signal (NSS) does not greatly increase so that the time required for the transmission of the non-standard set-up signal (NSS) does not increase. Thus, it is easy for the receiver RX to discriminate whether or not it is possible to shorten the pre-message procedure.

Figure 9A:
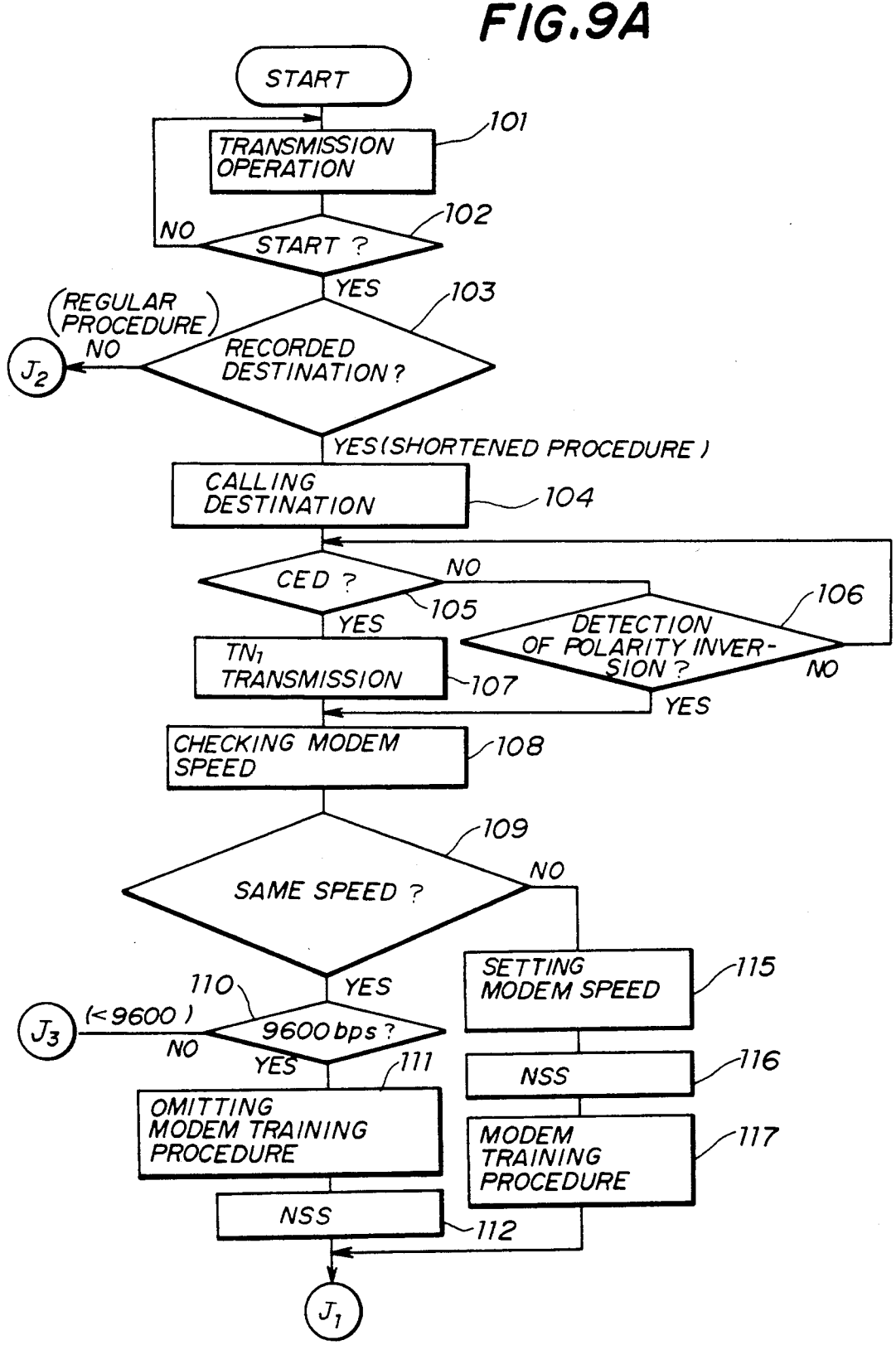
FIGS. 9A through 9C are flow charts showing an example of a process in the transmitter TX.
Figure 9B:
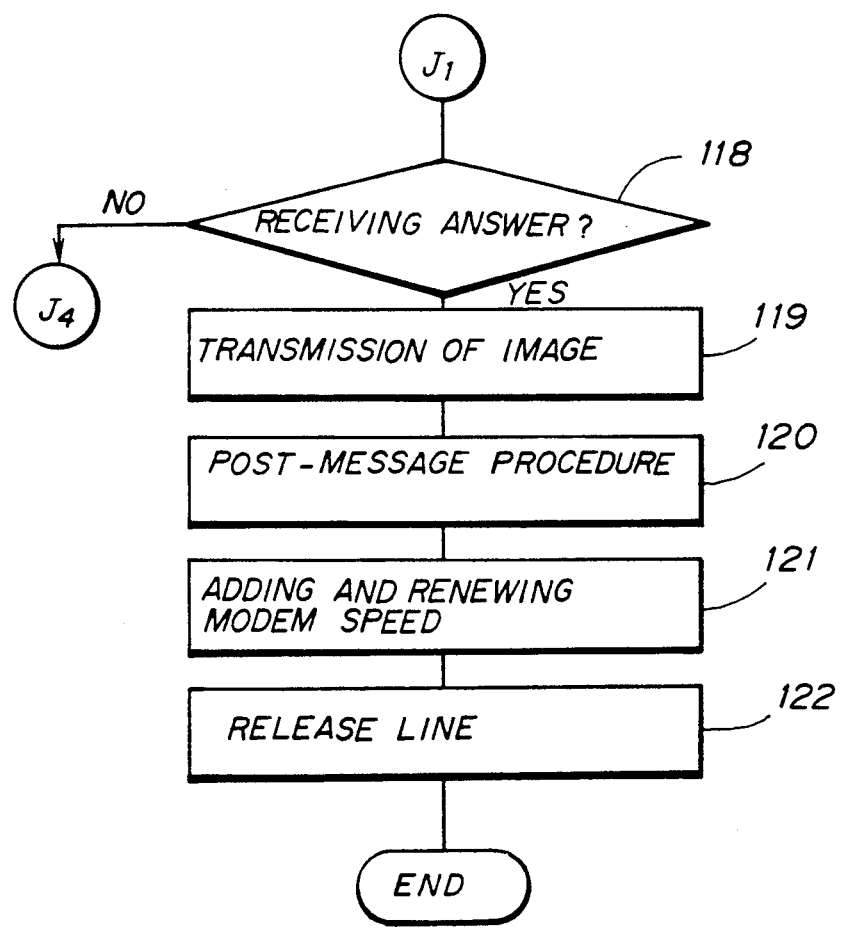
Figure 9C:
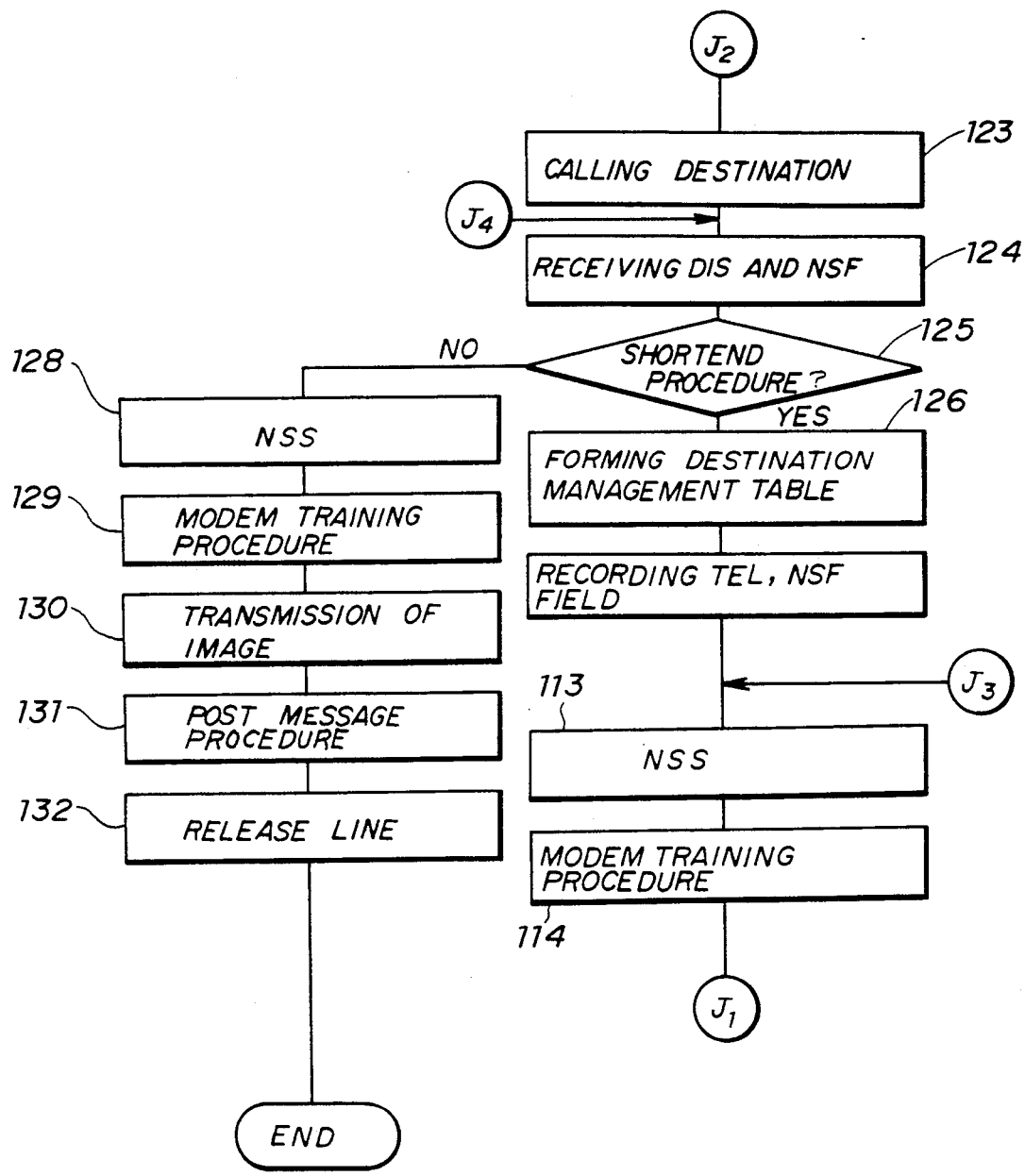

FIGS. 9A through 9C show an example of a process in the transmitter TX in detail. In FIG. 9, the pre-message procedure is mainly shown.

When an operation for a pre-transmission is performed by the operator, the process in accordance with the flow chart shown in FIG. 9 starts. In step 101, a process for a transmission operation is performed while step 102 determines whether or not a start key in the operation/display 6 is operated. When the start key is operated and the result in step 102 is YES, step 003 determines whether or not the destination management table having the telephone number information (TEL) corresponding to the telephone number of the destination station (the receiver RX) input by the operator has been formed in the RAM 3. When the result obtained in step 103 is YES, the shortened pre-message procedure is performed as has been described above. That is, the following process is performed. In step 104, the destination station is called, step 105 determines whether or not the called station identification signal (CED) has been received, and step 106 discriminates whether or not the polarity inversion has been detected by the network controller 10. When the called station identification signal (CED) is received and the result at step 105 is YES, the network controller 10 outputs the tone signal TN1 in step 107 and then step 108 searches the modem speed history information (HSS) in the destination management table corresponding to the receiver RX. When the polarity inversion is detected and so the result obtained at step 106 is YES, in step 108, the modem speed history information (HSS)is immediately serched.

Step 109 determines whether or not all the modem speeds included in the modem speed history information (HSS) are identical to each other. When the result in step 109 is YES, step 110 determines whether or not the value of each of the modem speeds is 9600 bps. When the result obtained at step 110 is YES, step 111 sets up to omit the modem training procedure from the pre-message procedure. Then, step 112 forms the non-standard set-up signal (NSS) for setting up the transmission functions and sends the non-standard set-up signal (NSS). The transmission functions are determined by referring to the NSF field information (FNN) in the destination management table formed in the RAM 3. When the learning information (LRN) is included in the destination management table, the learning information (LRN) is added to the information field of the non-standard set-up signal (NSS). The information included in the non-standard set-up signal (NSS) is not changed in the following cases.

When the result in the step 110 is NO, step 113 immediately forms the non-standard set-up signal (NSS) for setting up the transmission functions and sends the non-standard set-up signal (NSS). The transmission functions are determined by referring the NSF field information (FNN) recorded in the destination management table. In this case, the modem speed is set up at 9600 bps, which is the maximum value, because there is a possibility of transmitting information at the maximum modem speed. After that, step 114 performs the modem training procedure.

When at least one of modem speeds in the modem speed history information (HSS) differs from other modem speeds therein and the result obtained at step 109 is NO, step 115 selects the optimum modem speed from the modem speeds in the modem speed history information (HSS) by selecting which modem speeds occor most frequently, and the selected optimum modem speed is set up as a modem speed use for the communication. Then step 116 forms the non-standard set-up signal (NSS) for setting up the transmission functions and sends this signal. The transmission functions are determined referring to the NSF field information (FNN) recorded in the destination management table. After that, step 117 performs the modem training procedure.

After the pre-message procedure is performed, as has been described above, step 118 determines whether or not a predetermined answer signal sent from the receiver RX has been received. When the result in the step 118 is YES, sep 119 performs the process for transmitting the image information output from the scanner 4 at the set modem speed, and then step 120 performs a post-message procedure. After that, step 121 adds the new modem speed used for the communication to the modem speed history information (HSS) in the destination management table. Then, when step 122 releases the telephone line, the transmission process series is completed.

In step 121, when the memory area corresponding to the modem history information (HSS) has an empty part, the new modem speed is stored in the empty part. When the memory area corresponding to the modem history information (HSS) has no empty part, the new modem speed is substituted for the oldest modem speed in the modem speed history information (HSS).

On the other hand, when the destination management table corresponding to the destination station specified by the operator is not formed in the RAM 3, and the result in step 103 is NO, the regular procedure is performed. That is, step 123 calls the destination station (the receiver RX) specified by the operator, and then step 124 performs the process for the receiving of the digital identification signal (DIS) and the non-standard facilities signal (NSF) transmitted from the receiver RX. Step 125 determines whether or not the information corresponding to the shortened procedure has been included in the received non-standard facilities signal (NSF). When the result obtained at step 125 is YES, step 126 forms the new destination management table related to the destination station. The destination management table includes the telephone number information (TEL) and the NSF field information (FNN). When the non-standard facilities signal (NSF) has learning information (LRN), the learning information (LRN) is included in the destination management table. Step 127 performs the process for storing the destination management table formed in step 126 in the RAM 3. Then, the transmission function is set up on the basis of the NSF field information (FNN), and the procedure thereafter is performed starting from step 113 in the same manner as that described above.

When the destination station has no function of the shortened procedure and the result obtained at step 125 is NO, step 128 determines the transmission function by referring to the information field in the non-standard facilities signal (NSF) and the non-standard set-up signal (NSS) for setting up the determined transmission function is formed and transmitted. Then step 129 performs the modem training procedure. After that, step 130 performs the process for transmitting the image information, step 131 performs the post-message procedure, and step 132 releases the telephone line so that the transmission procedure series is completed.

When the answer signal which should be received during the process in accordance with the shortened procedure is not received, and so the result in step 118 is NO, the process starts from step 124 in the same manner as that described above.

Figure 10:
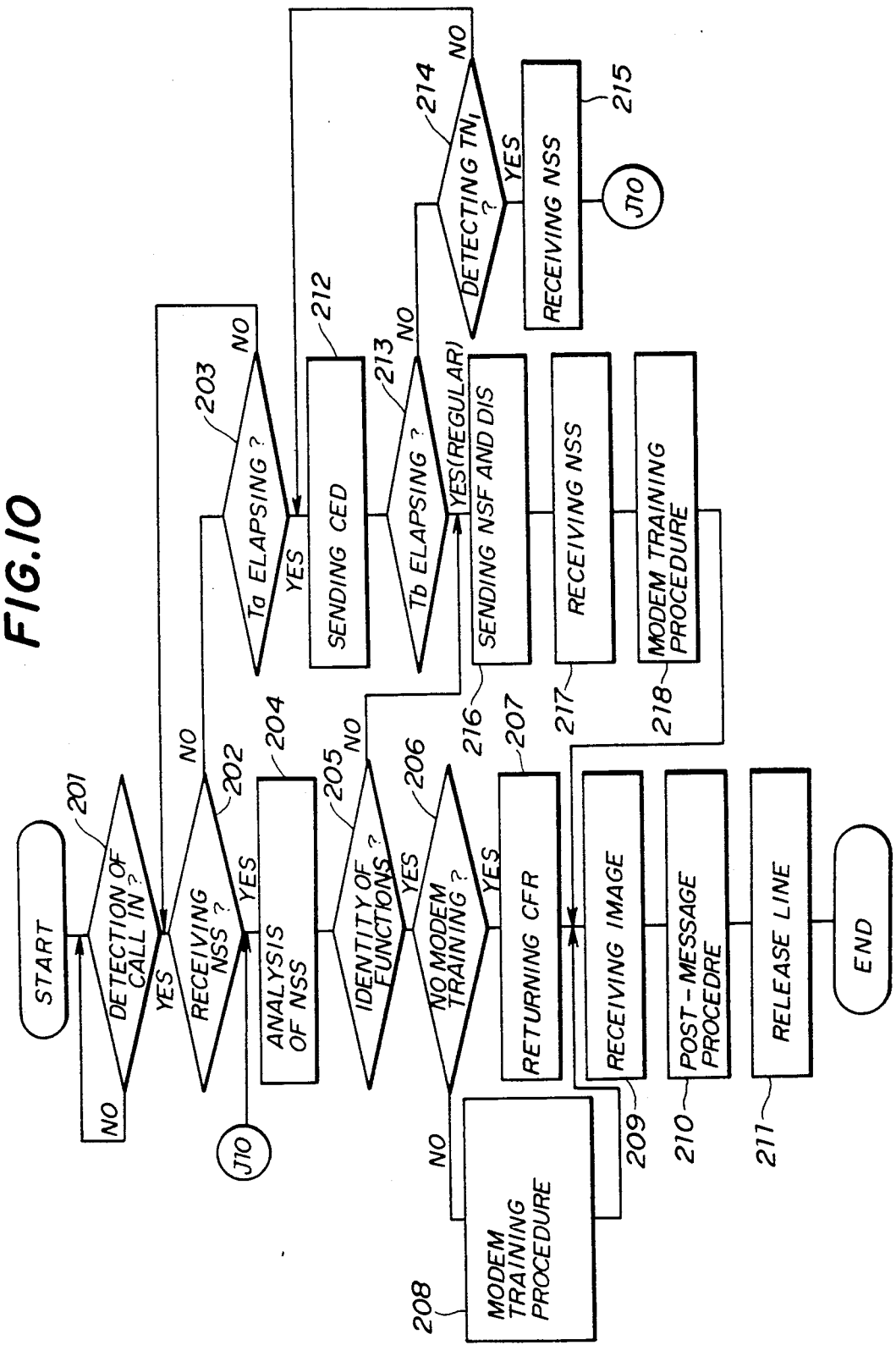
FIG. 10 is a flow chart showing an example of a process in the receiver RX.

FIG. 10 shows an example of a process in the receiver RX in detail.

Step 201 watches whether or not a call is detected. When the network controller 10 detects the call and the result in the step 201 is YES, step 202 watches whether or not the non-standard set-up signal (NSS) has been received while step 203 determines whether or not a constant time Ta has elapsed from a time at which the call was detected. When the non-standard set-up signal (NSS) transmitted from the transmitter TX has been received within the time Ta, the result obtained at sep 202 is YES, and then the shortened procedure is performed as follows.

Step 204 performs the process for the analysis of the information in the non-standard set-up signal (NSS), and step 205 determines whether or not the transmission functions corresponding to the information in the non-standard set-up signal (NSS) are identical to the functions capable of being used in the receiver RX. In this process, when the receiver RX is informed that the learning information (LRN) has been added to the non-standard set-up signal (NSS), it is determined whether or not the learning information (LRN) is identical to the flame check sequence (FCS) included in the data flame of the non-standard facilities signal (NSF). When the result in the step 205 is YES, in step 206 it is determined whether or not any modem training procedure is set up. When the result in step 206 is YES, step 207 performs the process for returning the confirmation received signal (CFR), on the other hand when the result in step 206 is NO, step 208 performs a predetermined modem training procedure. The process described above is completed so that the preparation for receiving the image information is completed. After that, step 209 performs a predetermined process for receiving the image information transmitted from the transmitter TX. When the process for receiving the image information in step 209 is completed, step 210 performs the post-message procedure and step 211 releases the telephone line, and so the process series for receiving the image information is completed.

On the other hand, when the receiver RX receives does not receive the non-standard set-up signal (NSS) before the time Ta has elapsed from a time at which the call was detected and the result in step 203 is YES, step 212 performs the process for sending the called station identification signal (CED), and step 214 determines whether or not the tone signal TN1 has been transmitted from the transmitter TX while step 213 determines whether or not the time Tb for sending the called station identification signal (CED) has elapsed. When the tone signal TN1 is detected before the time Tb for sending the called station identification has elapsed and so the result in step 214 is YES, step 215 performs the process for receiving the non-standard set-up signal (NSS), and then the process is returned to step 204. After that, the shortened procedure is performed.

When the tone signal TN1 is not detected before the time Tb for sending the called station identification signal (CED) has elapsed and so the result in step 213 is YES, the transmission procedure is performed in the same manner as the regular transmission procedure. That is, step 216 performs the process for sending the digital identification signal (DIS), and then step 217 performs the process for receiving the non-standard set-up signal (NSS) (or the digital identification signal (DCS)) and so the transmission functions used for the communication are determined. After that, step 218 performs the modem training procedure and then the process returns to step 209 so that the image information is received in accordance with the determined transmission procedure.

Figure 11:
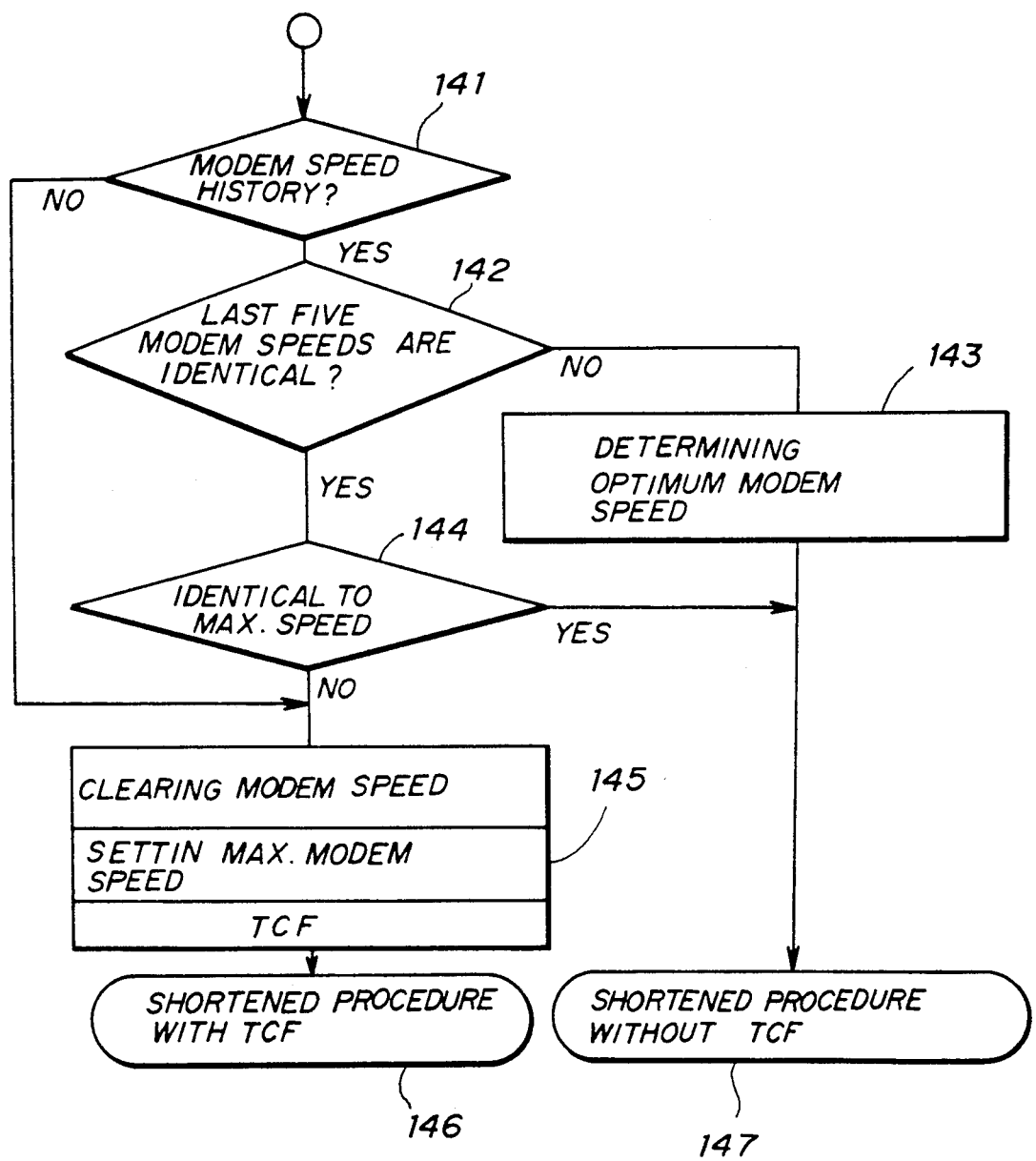
FIG. 11 is a flow chart showing an example of a process for determining the modem speed.

A description will now be given of another detailed example of the procedure for determining the modem speed (bit rate) with reference to FIGS. 11 through 13.

Figure 13:
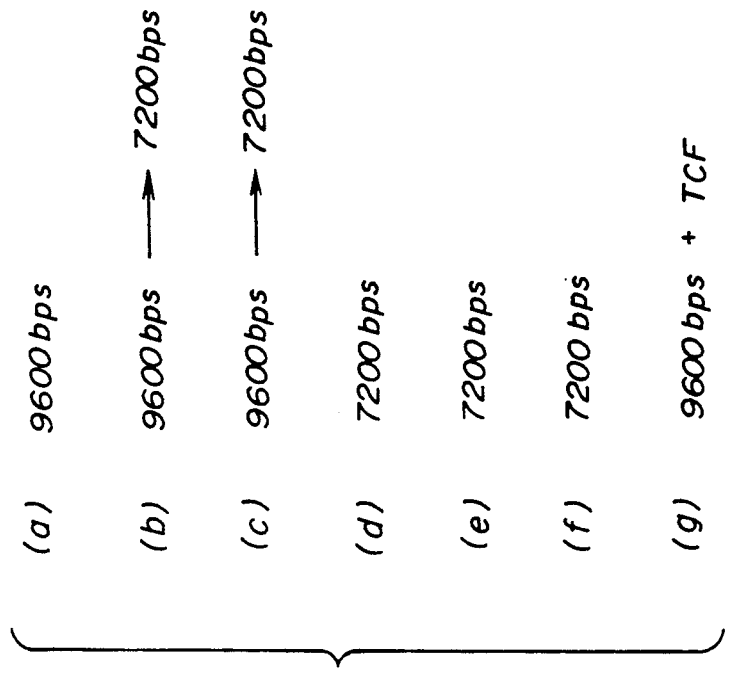
FIG. 13 shows a condition for determining modem speed.

The process shown in FIG. 13 is performed in the transmitter TX.

Step 141 determines whether or not modem speeds has been included in the modem speed history information (HSS) in the destination management table. When the result in step 141 is YES, step 142 determines whether or not the last five modem speeds in the modem speed history information (HSS) have equal values. When the result in step 142 is NO, step 143 selects the optimum modem speed from the last five modem speeds. The optimum modem speed is determined as a modem speed which occurs most frequently in the last five modem speeds. After that, step 147 performs the process for the shortened pre-message procedure in which the modem training procedure is omitted.

When two or more modem speeds which occur most frequency are selected, the greatest modem speed from among the selected modem speeds is determined as the optimum modem speed in step 143.

When the last five modem speeds in the modem speed history information (HSS) have equal values and the result in step 142 is YES, step 144 determines whether or not each of the five modem speeds is identical to the maximum modem speed on the telephone line (for example, 9600 bps). When the result in step 144 is YES, the shortened pre-message procedure is performed but the modem training procedure in step 147 is not performed, as has been described above.

When each of the last five modem speeds is not identical to the maximum modem speed and the result in step 144 is NO, step 145 performs the following process. All the modem speeds are cleared from the modem speed history (HSS). The maximum modem speed (for example, 9600 bps) is newly written in the modem speed history (HSS) in the destination management table. The training check signal (TCF) is generated. After that, step 146 performs both the process for the shortened pre-message procedure and the modem training procedure.

Figure 12:
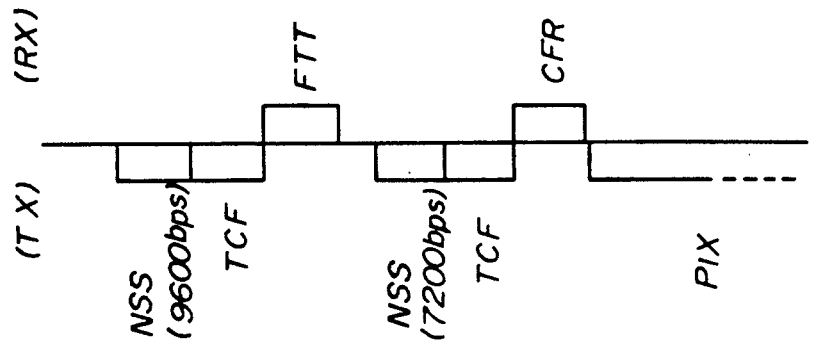
FIG. 12 is a diagram showing another example of a communication protocol between the transmitter TX and the receiver RX.

FIG. 12 shows a communication protocol in a case where the modem speed which is set up first is changed. The transmitter TX sets the modem speed to 9600 bps (the maximum modem speed) and transmits the training check signal (TCF) for the modem training. When the modem training between the transmitter TX and receiver RX fails, the receiver RX returns a failure to train signal (FTT). Then, when the transmitter TX receives the failure to train signal (FTT), the transmitter TX sets the modem speed again, and the modem training procedure is performed. The transmitter TX, for example, sets the modem speed to 7200 bps and transmits the training check signal (TCF). When the modem training procedure in this condition succeeds and the transmitter TX receives the confirmation to receive signal (CFR) sent from the receiver RX, the image data (PIX) is transmitted from the transmitter TX to the receiver RX at 7200 bps. When the transmission of the image information is completed, the modem speed 7200 bps which is used for the transmission of the image information is written in the modem speed history (HSS) in the destination management table.

FIG. 13 shows an example of a process for selecting the modem speed.

(a) First communication

The image is transmitted at 9600 bps. When the transmission of the image information is completed, the modem speed 9600 bps is written in the modem speed history (HSS).

(b) Second communication

The modem speed 9600 bps is selected from the modem speed history information (HSS). But the modem speed is changed to 7200 bps. Then the shortened pre-message procedure is performed at 7200 bps. After that, the image information is transmitted at 7200 bps. When the transmission of the image information is completed, the modem speed 7200 bps is added to the modem speed history information (HSS).

(c) Third communication 9600 bps is greater than 7200 bps so that the modem speed 9600 bps is selected from the modem speed history (HSS). The modem speed is changed to 7200 bps in the same manner as the second communication. The communication between the transmitter TX and the receiver RX is performed at 7200 bps in the same manner as the second communication. Then the modem speed 7200 bps is added to the modem speed history information (HSS).

(d) Fourth communication

The number of 9600 bps in the modem speed history information (HSS) is one and the number of 7200 bps in the modem speed history (HSS) is two. Therefore, the modem speed 7200 bps is selected. Then, when the transmission of the image information is completed, the modem speed 7200 bps is added to the modem speed history information (HSS).

(e) Fifth communication and (f) Sixth communication

In both cases, the modem speed 7200 bp is selected and is added in the modem speed history information (HSS) after the transmission of the image information in the same manner as the fourth communication.

(g) Seventh communication

The last five modem speeds in the modem speed history information (HSS) are identical to each other. That is, each of the last five modem speeds is 7200 bps. Thus, these five modem speeds are cleared from the modem speed history information (HSS) in the destination management table, and the modem speed 9600 bps, which is the maximum modem speed, is newly written in the modem speed history information (HSS) in the destination management table.

Then, both the pre-message procedure and the modem training procedure are performed at 9600 bps.

Figure 14A:
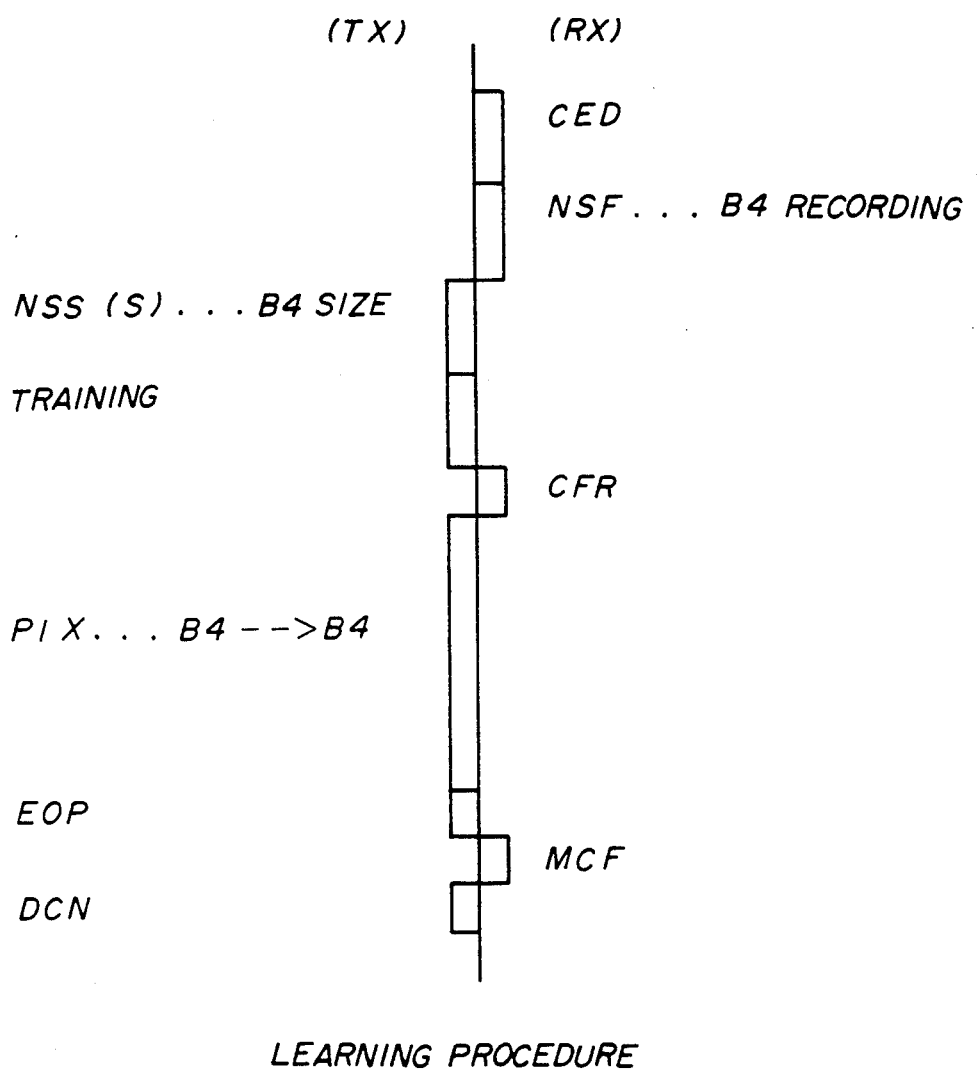
FIGS. 14A through 14C are diagrams showing other examples of communication protocols between the transmitter TX and the receiver RX.
Figure 14B:
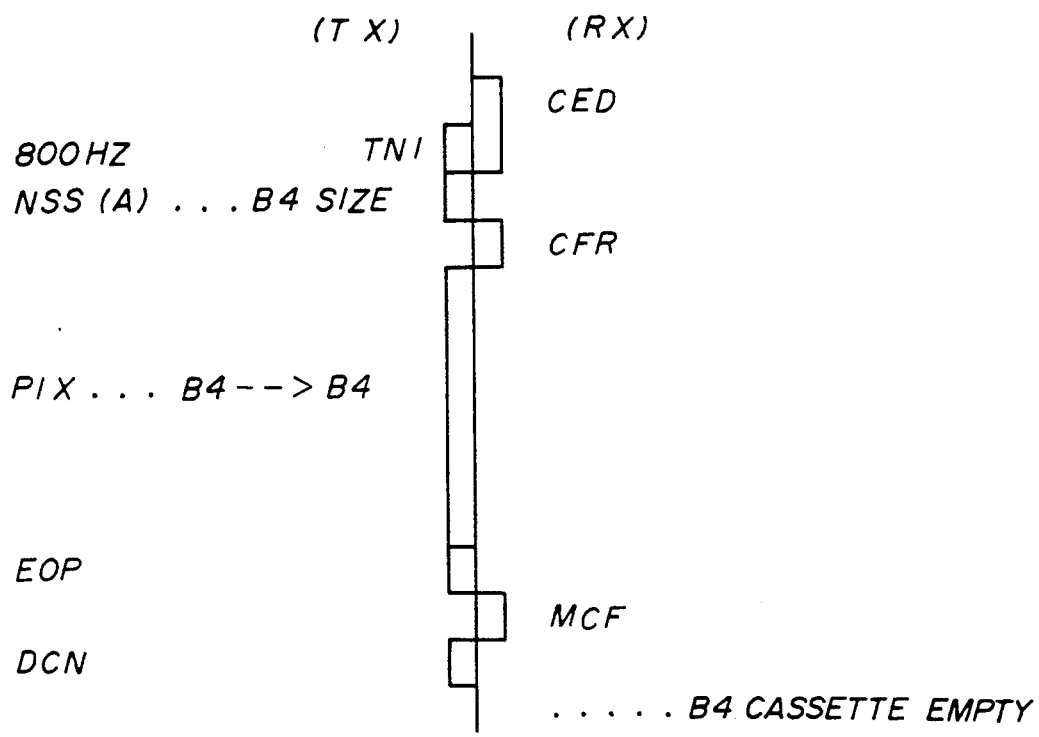
Figure 14C:
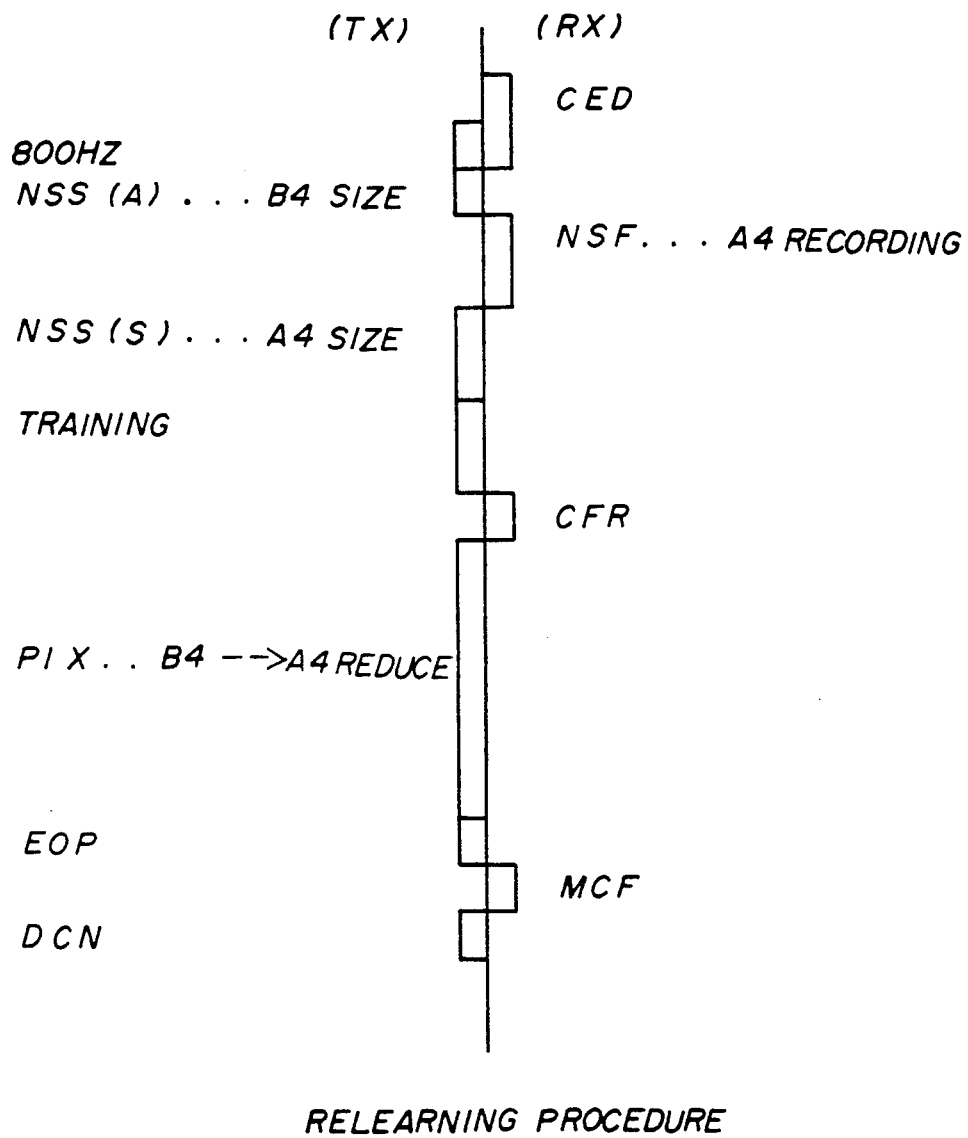

FIGS. 14A through 14c show an example of a process for the learning. In this example, the transmitter TX transmits the image information recorded on a B4 size document and the receiver RX has two sheet cassettes which respectively contain B4 size recording sheets and A4 size recording sheets.

FIG. 14A shows the regular procedure.

When the receiver RX which is called by the transmitter TX successively sends the called station identification signal (CED) and the non-standard facilities signal (NSF). The non-standard facilities signal (NSF) includes information which indicates that it is possible to record the image on the B4 size recording sheet.

When the transmitter TX receives the non-standard facilities signal (NSF), the information in the NSF field of the data flame of the non-standard facilities signal (NSF) is recorded as the NSF field information (FNN) in the destination management table specified by the telephone number of the receiver RX (the destination station). The information in the flame check sequence (FCS) of the data flame of the non-standard facilities signal (NSF) is also recorded as the learning information (LRN) in the destination management table. The information in the flame check sequence (FCS) of the non-standard facilities signal (NSF) corresponds to the information which indicates that it is possible to record the image on the B4 size recording sheet. Therefore the learning information (LRN) also corresponds to the information which indicates that it is possible to record the image on the B4 size recording sheet.

After this, the transmitter TX transmits the non-standard set-up signal (NSS) including the information which indicates the transmission of the B4 size image information. Then, the B4 size image information is transmitted without changing the size to the receiver RX.

In the next communication, the shortened pre-message procedure is performed between the transmitter TX and the receiver RX as shown in FIG. 14B. This shortened pre-message procedure is the same as that shown in FIG. 4C. Then, the B4 size image information is transmitted without changing the size to the receiver RX.

It is assumed that the sheet cassette for B4 size recording sheet in the receiver RX is empty when the communication shown in FIG. 14B is completed.

Further communication is performed by the procedure as shown in FIG. 14C. The information in the non-standard set-up signal (NSS) transmitted from tee transmitter TX is not identical to the information in the non-standard facilities signal (NSF) generated by the receiver RX, because, although the transmitter TX is prepared to send the B4 size image information, the receiver has no B4 size recording sheet. Therefore, the receiver RX sends the new non-standard facilities signal (NSF) including the information which indicates that the receiver RX has only the A4 size recording sheets. When the transmitter TX receives the new non-standard facilities signal (NSF) sent from the receiver RX, the NSR field information (FNN) in the destination management table is substituted for the new information in the non-standard facilities signal (NSF). The learning information (LRN) in the destination management table is also substituted for the new information in the flame check sequence (FCS) of the new non-standard facilities signal (NSF). The new learning information (LRN) corresponds to the recording of the A4 size image.

After that, the transmitter TX transmits the non-standard set-up signal (NSS) including the information which indicates the transmission of the A4 size image information. Then, the B4 size image information is reduced to the A4 size image information, and the A4 image information is transmitted to the receiver RX.

Figure 15:
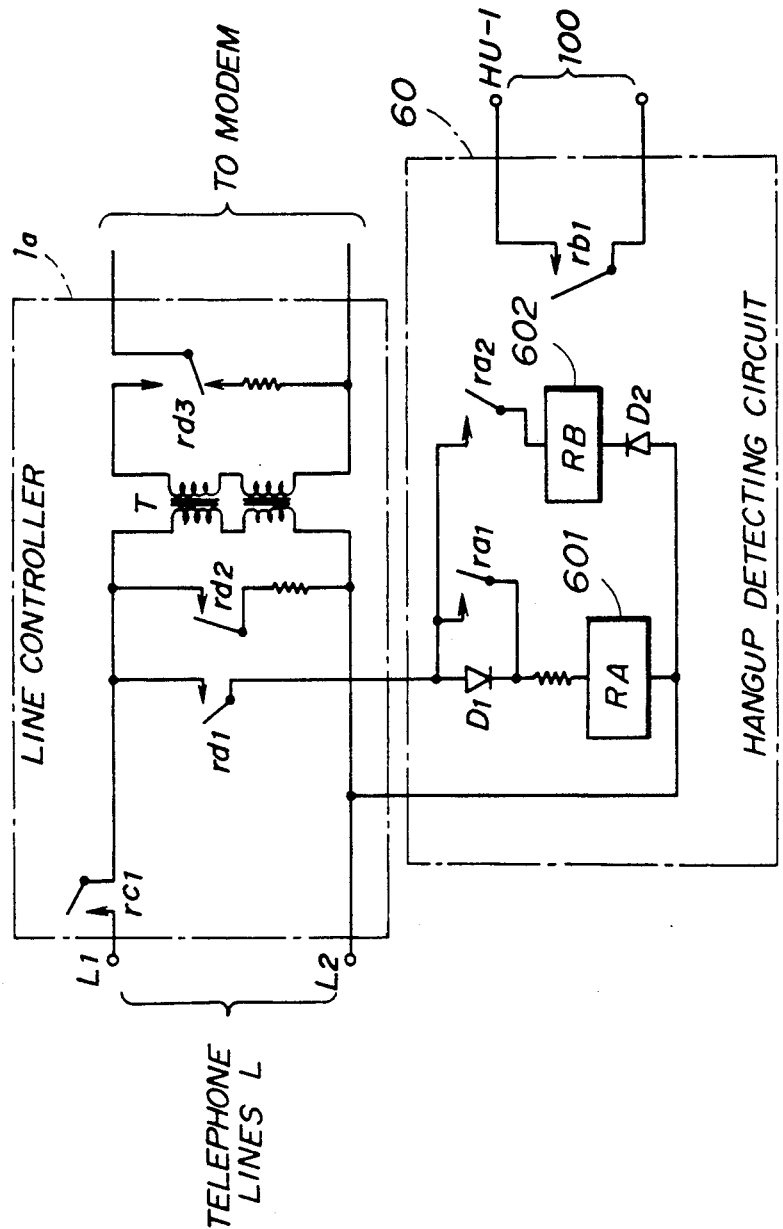
Figure 16:
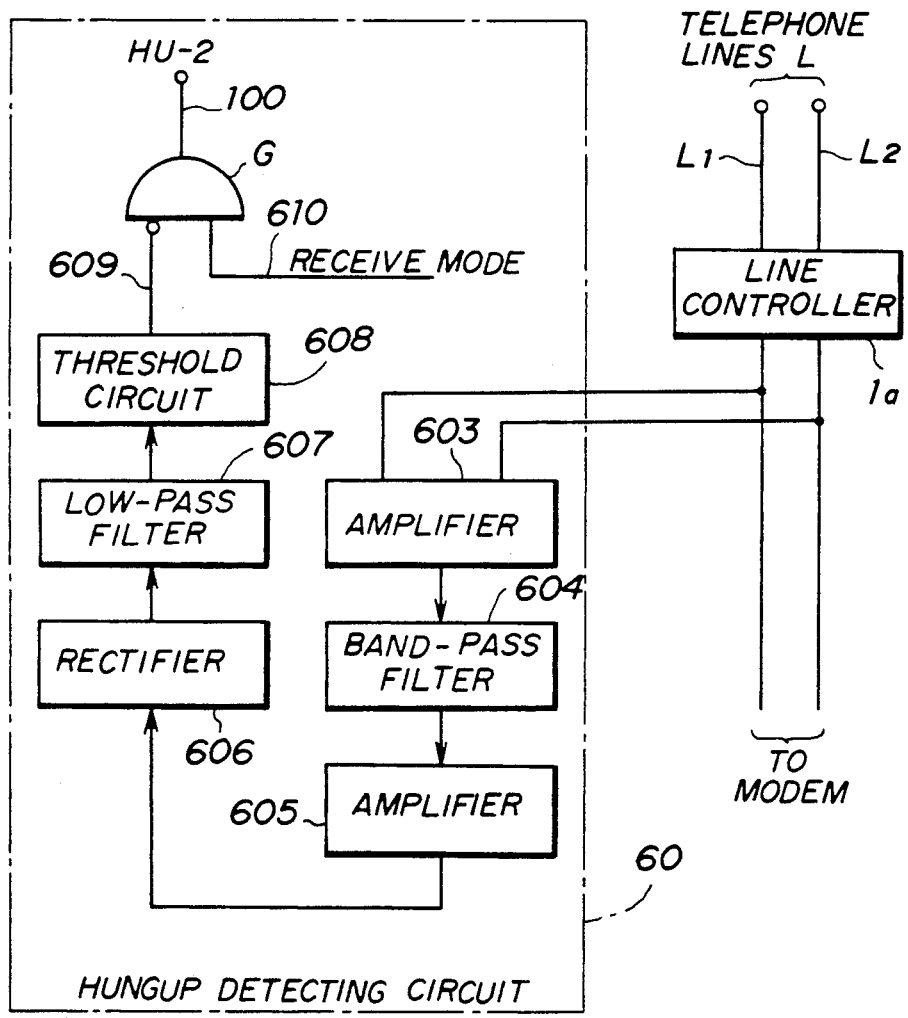

FIGS. 15 through 17 show hangup detecting circuits. These hangup detecting circuits are disclosed in U.S. Pat. No. 3,962,534, the disclosure of which is hereby incorporated by reference.

Each hangup detecting circuit detects the hangup of the receiver RX and outputs the detection signal. It is possible to start the shortened procedure as shown in FIGS. 4B, 5A and 6A when the hangup detecting circuit outputs the detection signal.

According to the present invention, the procedure for sending the non-standard facilities signal (NSF) is omitted so that it is possible to shorten the time required for the pre-message procedure.

The modem speed to be used for communication between the transmitter and the receiver is difinitely determined so that the time required for the pre-message procedure is decreased.

In addition, the procedure for the training is omitted so that it is possible to decrease the time required for the pre-message procedure.

Furthermore, the time for determining the transmission function is decreased so that it is possible to shorten the time required for the pre-message procedure.

The present invention is not limited to the aforementioned embodiments, and variations and modifications may be made without departing from the scope of the claimed invention.

What is claimed is:

1. A facsimile image system comprising:
   a transmitting unit;
   a receiving unit for connection to said transmitting unit by a communication line; and
   pre-message procedure means for performing a pre-message procedure between said transmitting unit and said receiving unit before said transmitting unit transmits image information to said receiving unit, said pre-message procedure means having
   first procedure means for sending a first signal for identifying said receiving unit to said transmitting unit,
   second procedure means for sending a second signal for informing said transmitting unit about functions provided in said receiving unit,
   third procedure means for determining transmission functions to be used for communicating with said receiving unit and for sending a third signal corresponding to said transmission functions to said receiving unit, and
   fourth procedure for setting said transmission functions in said receiving unit by referring to said third signal,
   wherein said transmitting unit comprises:
   hangup detecting means for detecting a hangup of said receiving unit called by said transmitting unit,
   tone signal generating means for generating a tone signal,
   memory means for storing function information regarding said functions provided in said receiving unit,
   first control means, coupled to said hangup detecting means and said memory means, for activating said third procedure means by referring to said function information stored in said memory means when said hangup detecting means detects said hangup of said receiving unit before said first procedure, and
   second control means, coupled to said tone signal generating means and said memory means, for sending said tone signal generated by said tone signal generating means to said receiving unit and for activating said third procedure means by referring to said function information stored in said memory means after sending said tone signal when said first procedure means is activated before said hangup detecting means detects said hangup of said receiving unit, and
   wherein said receiving unit comprises:
   third control means for omitting activation of said first procedure means and said second procedure means when said third procedure means is activated before activation of said first procedure means, and
   fourth control means for omitting activation of said second procedure means when said tone signal is received before deactivation of said first procedure means.

2. A system as claimed in claim 1, wherein said hangup detecting means has polarity inversion detecting means for detecting a polarity inversion of dc-power on said communication line.

3. A system as claimed in claim 1, wherein said pre-message procedure has a procedure in a phase B described in CCITT Recommendations.

4. A system as claimed in claim 1, wherein both said transmitting unit and said receiving unit are group three facsimile machines described in CCITT Recommendations.

5. A system as claimed in claim 1, wherein said function information is formed of information included in said second signal received by said transmitting unit from said second procedure means, and wherein means for storing said information included in said second signal in said memory means is provided.

6. A system as claimed in claim 1, wherein said second signal has a non-standard facilities signal represented by NSF described in CCITT Recommendations.

7. A system as claimed in claim 6, wherein said third signal has a non-standard set-up signal represented by NSS described in CCITT Recommendations.

8. An image communication system comprising:
   a transmitting unit;
   a receiving unit for connection to said transmitting unit by a communication line;
   pre-message procedure means for performing a pre-message procedure for determining transmission functions used for a communication between said transmitting unit and said receiving unit before said transmitting unit transmits image information to said receiving unit; and
   wherein said transmitting unit is comprised of:
   history table for storing the modem speed used during each period communication between said transmitting unit and said receiving unit;
   determining means for determining an optimum modem speed to be used for a communication between said transmitting unit and said receiving unit by referring the modem speeds stored in said history table during said pre-message procedure; and
   control means for clearing stored modem speeds from said history table and for supplying a predetermined optimum modem speed to said history table when a number of modem speeds, which are identical to each other, stored in said history table becomes equal to a predetermined number.

9. A system as claimed in claim 8, wherein said determining means determines said optimum modem speed from said modem speeds stored in said history table by determining which prior stored modem speeds occur most frequently.

10. A communication system as claimed in claim 9, wherein said determining means has a selecting means for selecting the largest modem speed from a plurality of modem speeds which occur with a largest frequency in said history table.

11. A system as claimed in claim 8, wherein said predetermined optimum modem speed is a maximum modem speed permitted for communication between said transmitting unit and said receiving unit.

12. A system as claimed in claim 8, wherein said pre-message procedure means includes a training procedure means for sending a training signal to determine if communication with said receiving unit is possible by said transmission functions, and wherein said transmitting unit further comprises training determining means for determining if a training procedure is performed by said training procedure means, on the basis of a history of said modem speeds in said history table,
wherein said training procedure means is activated when a result in said training determining means is YES, and wherein said transmitting unit omits activation of said training procedure, and said receiving unit prepares to receive the image information, when said result in said training determining means is NO.

13. A system as claimed in claim 13, wherein said training determining means determines that activation of said training procedure means is omitted when the last n (n is an integer) modem speeds in said history table are identical to the maximum modem speed permitted for communication between said transmitting unit and said receiving unit.

14. An image communication system comprising:
a transmitting unit;
a receiving unit for connection to said transmitting unit by a communication line, and
pre-massage procedure means for performing a pre-message procedure for determining transmission functions used for a communication between said transmitting unit and said receiving unit is performed between said transmitting unit and said receiving unit before said transmitting unit transmits image information to said receiving unit, said pre-message procedure means having:
informing function procedure means for sending an informing signal to said transmitting unit for informing about functions provided in said receiving unit,
determining function procedure means for determining transmission functions used for communicating with said receiving unit and for sending a function signal representing said transmission functions to said receiving unit, and
setting procedure means for setting said transmission functions in said receiving unit by referring to said function signal,
wherein said informing signal has a first field including information corresponding to said functions provided in said receiving unit and a second field including checking information for checking a transmission error of said informing signal, said checking information having a one-to-one correspondence with said information included in said first field of said informing signal,
wherein said transmitting unit comprises:
memory means for storing said information included in said first field of said informing signal and said checking information,
first control means, coupled to said memory means, for activating said determining function procedure means by referring to said information in said memory means and for adding said checking information in said memory means to said function signal, and
wherein said receiving unit comprises:
checking means for determining if the checking information included in said function signal transmitted from said transmitting unit is identical to the checking information included in said informing signal generated by said receiving unit, and
second control means, coupled to said checking means, for activating said setting procedure means by referring to said function signal when said checking means determines that the checking information included in said function signal transmitted from said transmitting unit is identical to the checking information included in said informing signal.

15. A system as claimed in claim 14, wherein said transmitting unit further comprises hangup detecting means for detecting a hangup of said receiving unit called by said transmitting unit, wherein said first control means activates said determining function procedure means by referring to said information in said memory means and adding said checking information in said memory means to said function signal when said hangup detecting means detects said hangup of said receiving unit before said informing function procedure, and wherein said receiving unit further comprises third control means for omitting activation of said informing function procedure means when said determining function procedure is performed before starting said informing function procedure.

16. A system as claimed in claim 15, wherein said hangup detecting means has a polarity inversion detecting means for detecting a polarity inversion of dc-power on said line.

17. A system as claimed in claim 14, wherein said receiving means further comprises fourth control means, coupled to said checking means, for activating said informing function procedure means when said checking means determines that the checking information included in said function signal transmitted from said transmitting unit is not identical to the checking information included in said informing signal generated by said receiving unit, and wherein said transmitting unit further comprises a fifth control means for changing the information and the checking information in said memory means by referring to said informing signal given by said fourth control means in said receiving unit.

18. A system as claimed in claim 14, wherein said informing signal has a non-standard facilities signal represented by NSF described in CCITT Recommendations and said checking information has a frame check sequence information represented by FCS described in CCITT Recommendations.

19. A system as claimed in claim 18, wherein said function signal has a nonstandard set-up signal represented by NSS described in CCITT Recommendations and said frame checking sequence information is added in an information field of said non-standard set-up signal.

20. An image communications system comprising:
a transmitting unit for transmitting information;
a plurality of receiving units, each for selectively receiving a message from the transmitting unit including the information;
pre-message procedure means for determining optimum operating conditions for transmitting the massage from the transmitting means to one of the plurality of receiving units selected to receive the information based on pre-message transmission data exchanged between the transmitting unit and the selected receiving unit;

storage means for storing information concerning the optimum operating conditions used for transmitting information between the transmitting unit and each of the plurality of receiving units during each communication between the transmitting unit and each of the plurality of receiving units; and control means for preventing operation of the pre-message procedure means when the storage means includes information concerning the optimum operating conditions for the receiving unit selected to receive a message from the transmitting unit and for selecting the optimum operating conditions for communication between the transmitting unit and the selected one of the plurality of receiving units based on information stored in said storage means.

* * * * *